United States Patent
Yonemoto

(12) 
(10) Patent No.: US 6,366,321 B1
(45) Date of Patent: *Apr. 2, 2002

(54) SOLID STATE IMAGING DEVICE HAVING A RESET SWITCH FOR RESETTING POTENTIAL OF CAPACITOR AND VERTICAL SIGNAL LINE

(75) Inventor: Kazuya Yonemoto, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/291,487

(22) Filed: Apr. 14, 1999

Related U.S. Application Data

(62) Division of application No. 08/745,741, filed on Nov. 12, 1996, now Pat. No. 6,037,979, which is a division of application No. 08/378,405, filed on Jan. 26, 1995, now abandoned.

(30) Foreign Application Priority Data

Jan. 31, 1994 (JP) .............................................. 6-010032
Apr. 14, 1994 (JP) .............................................. 6-075942

(51) Int. Cl.$^7$ ................................................ H04N 3/14
(52) U.S. Cl. .................... 348/308; 250/208.1; 257/231; 257/291; 348/300; 348/297
(58) Field of Search ....................... 250/208.1; 348/272, 348/281, 282, 294, 296, 297, 302, 305, 307–311; 257/223, 229, 230, 231, 290, 291; H04N 3/14

(56) References Cited

U.S. PATENT DOCUMENTS

| | | | |
|---|---|---|---|
| 4,967,067 A | 10/1990 | Hashimoto et al. | 250/208.1 |
| 5,146,339 A | 9/1992 | Shinohara et al. | 348/301 |
| 5,270,531 A | 12/1993 | Yonemoto | 250/208.1 |
| 5,288,988 A | 2/1994 | Hashimoto et al. | 250/208.1 |
| 5,335,008 A | 8/1994 | Hamasaki | 348/301 |
| 5,339,106 A | 8/1994 | Ueno et al. | 348/243 |
| 5,386,108 A | 1/1995 | Arikawa et al. | 250/208.1 |
| 5,663,555 A | 9/1997 | Miyawaki et al. | 250/208.1 |
| 5,714,752 A | 2/1998 | Ueno et al. | 250/208.1 |
| 5,793,423 A | 8/1998 | Hamasaki | 348/302 |
| 5,953,060 A | * 9/1999 | Dierickx | 348/241 |
| 6,091,449 A | * 7/2000 | Matsunaga | 348/208 |

* cited by examiner

*Primary Examiner*—Wendy R. Garber
*Assistant Examiner*—Ngoc-Yen Vu
(74) *Attorney, Agent, or Firm*—Sonnenschein, Nath & Rosenthal

(57) ABSTRACT

An amplifier type solid-state imaging device is operated in a capacitor load operation system. This solid-state imaging device is made high in reliability and an arrangement of the horizontal output circuit portion is simplified. The solid-state imaging device includes a plurality of pixel MOS transistors each of which is connected between a voltage source ($V_{DD}$) and a vertical signal line, a control electrode thereof being connected to a scanning line and charges generated by photoelectric conversion being accumulated near the channel thereof, a load capacitor element connected between the vertical signal line and a first potential, and a reset MOS switch for resetting the load capacitor element to a reset potential. A potential of the vertical signal line is also reset. When a signal is read out, the potential of the load capacitor element is set to substantially the same potential as the channel potential of the pixel MOS transistor. The capacitance of the load capacitor element is set to be larger than the capacitance of the vertical signal line. The reset potential is set to be shallower than the channel potential obtained in the pixel MOS transistor when no light is incident on the pixel MOS transistor, and a potential difference between it and a channel potential obtained when no light is incident on the pixel MOS transistor is set so as to fall within 2.0V.

6 Claims, 14 Drawing Sheets

SOLID STATE IMAGING DEVICE HAVING A RESET SWITCH FOR RESETTING POTENTIAL OF CAPACITOR AND VERTICAL SIGNAL LINE

PRIORITY CLAIM AND RELATED APPLICATIONS

The present application is a divisional application of Ser. No. 08/745,741, filed Nov. 12, 1996, (now U.S. Pat. No. , 6,037,979) which was a divisional application of Ser. No. 08/378,405, filed on Jan. 26, 1995, now abandoned.

BACKGROUND OF THE INVENTION

The present invention relates to solid-state imaging device and, more particularly, is directed to a solid-state imager having FETs (field effect transistors) and load capacitors.

As the demand for high resolution solid-state imaging devices increases, there have been developed so far internal amplifier type solid-state imaging devices for amplifying light signal charges at every pixel. As the internal amplifier type solid-state imaging device, there are mainly various kinds of imaging device structures, such as a static induction transistor (SIT), an amplifying type MOS imager (AMI), a charge modulation device (CMD) and a BASIS (base-stored image sensor) using a bipolar transistor as a pixel.

An amplifier type solid-state imaging device called a WAM (well control amplified MOS (metal oxide semiconductor) imager) is known as one of such internal amplifier type solid-state imaging devices. In this amplifier type solid-state imaging device, holes (signal charges) obtained by photoelectric conversion are accumulated in a P-type potential well of an N-channel MOS transistor (pixel MOS transistor) and the change of a channel current based on the change of potential in the P-type potential well (i.e., change of potential in the back gate) is output as a pixel signal.

FIG. 1 of the accompanying drawings shows an example of an amplifier type solid-state imaging device 11. As shown in FIG. 1, there are arrayed pixel MOS transistors [unit pixels (cells)] 1 in a matrix fashion. The gate of each pixel MOS transistor 1 is connected to a vertical scanning line 3 scanned by a vertical scanning circuit 2 formed of a shift register or the like. The drain of each pixel MOS transistor 1 is connected to a power supply line (line to which a voltage $V_{DD}$ is supplied) 4 and the source thereof is connected to a vertical signal line 5.

Each of the signal vertical signal lines 5 is connected with a load MOS transistor 6 whose gate has a bias voltage $V_B$ applied thereto. A sample and hold circuit 7 for sampling and holding a pixel signal also is connected to each vertical signal line 5. In FIG. 1, reference numeral 8 depicts a horizontal scanning circuit. The horizontal scanning circuit 8 outputs a pixel signal from the sample and hold circuit 7 through a horizontal output signal line 10 by sequentially supplying a scanning signal to the gate of each of horizontal MOS switches 9.

In the amplifier type solid-state imaging device 11, as shown in the schematic diagram of FIG. 1 and a diagram of an equivalent circuit of FIG. 2 realized when a pixel is scanned, the unit pixel, i.e. the pixel MOS transistor 1, is scanned by the vertical scanning circuit 2 through the vertical scanning line 3. Then, a signal obtained from a source-follower circuit formed of the pixel MOS transistor 1 and the load MOS transistor 6 connected to the vertical signal line 5 as a constant current source is sampled and held by the sample and hold circuit 7 and the horizontal MOS switches 9 connected to the horizontal scanning circuit 8 are sequentially energized to thereby output the signal of each pixel MOS transistor 1 through the horizontal 2 output signal line 10.

Specifically, the scanned pixel MOS transistor 1 and the load MOS transistor 6 operate as the source-follower circuit to output a source potential obtained under the condition that a current is constantly flowed in the pixel MOS transistor 1 via the sample and hold circuit 7 and the horizontal MOS switch 9. Therefore, it is possible to obtain a signal output of the solid-state imaging device by carrying out the above-mentioned operation at every horizontal scanning line while the vertical scanning line 3 for scanning the pixel MOS transistor 1 is being changed.

However, in the above-mentioned case, operation conditions of the pixel MOS transistor 1 disposed away from the load MOS transistor 6 and the pixel MOS transistor 1 disposed near the load MOS transistor 6 are changed by a distributed resistance with the result that sensitivity is deteriorated in the vertical direction.

If a constant current property of the load MOS transistor 6 operated as the constant current source is unsatisfactory, there is then the disadvantage that sensitivity of the solid-state imaging device is lowered. In other words, the load MOS transistor 6 operated as the constant current source is not an ideal constant current source. Therefore, if the source current of the pixel MOS transistor 1 is changed, then the constant current is fluctuated very slightly and a fluctuated amount of the constant current causes sensitivity to be lowered.

Moreover, since the constant current is always flowed when a signal voltage is read out from the pixel MOS transistor 1, an imaging device consumes much power.

Further, when the constant current of the load MOS transistor 6 is fluctuated, there is generated a vertical stripe-shaped fixed pattern noise (FPN) which is difficult to be removed by signal processing.

Furthermore, when a signal voltage is read out from the pixel MOS transistor 1, the constant current, i.e. a relatively large drain current is flowed, so that a mutual conductance gm of the pixel MOS transistor 1 is large. As a result, a random noise generated from the pixel MOS transistor 1 becomes large as compared with the mutual conductance gm.

OBJECTS AND SUMMARY OF THE INVENTION

In view of the aforesaid aspect, it is an object of the present invention to provide an amplifier type solid-state imaging device of a capacitor load operation system in which sensitivity can be made uniform, sensitivity can be increased, a power consumption can be reduced and a fixed pattern noise can be removed.

It is another object of the present invention to provide an amplifier type solid-state imaging device of a capacitor load operation system which can be made more reliable and in which an arrangement of a horizontal output circuit portion can be simplified.

It is a further object of the present invention to provide a solid-state imaging device of a capacitor load operation system in which a random noise of a pixel transistor can be reduced.

According to a first aspect of the present invention, there is provided a solid-state imaging device which is comprised of a plurality of pixel MOS transistors for storing signal charges generated by photoelectric conversion, each of the pixel MOS transistors composed of a gate electrode connected to a vertical scanning line, a drain connected to a voltage source and a source connected to a vertical signal line, a capacitor connected between the vertical signal line and a fixed potential, a reset device for resetting a potential of the capacitor to set a reset potential, and a switch for controlling a connection between one of the pixel MOS transistors and the capacitor so that a potential of the capacitor has the same potential as a channel potential of the pixel MOS transistor selected.

According to a second aspect of the present invention, there is provided a solid-state imaging device which is comprised of a plurality of pixel bipolar transistors for storing signal charges generated by photoelectric conversion, each of the bipolar pixel transistors being composed of a base connected to a scanning line, a collector connected to a voltage source and an emitter connected to a vertical signal line, a capacitor connected between the vertical signal line and a fixed potential, a switch disposed between the vertical signal line and the capacitor and a reset device for resetting the respective potentials of the capacitor and the vertical signal line.

In accordance with a third aspect of the present invention, there is provided a solid-state imaging device which is comprised of a plurality of pixel bipolar transistors for storing signal charges generated by photoelectric conversion, each of the pixel bipolar transistors being composed of a base connected to a vertical scanning line, a collector connected to a voltage source and an emitter connected to a vertical signal line, a capacitor connected between the vertical signal line and a fixed potential and a reset device for resetting a potential of the capacitor to set a reset potential which is shallower than that obtained in a base of the pixel bipolar transistor when no light is incident on the pixel bipolar transistor, a difference between the reset potential and the base potential being set so as to fall within 2.0V.

DETAILED DESCRIPTION OF THE PREFERRED EMBODIMENTS

The present invention will be described below with reference to the drawings.

Figure 3:
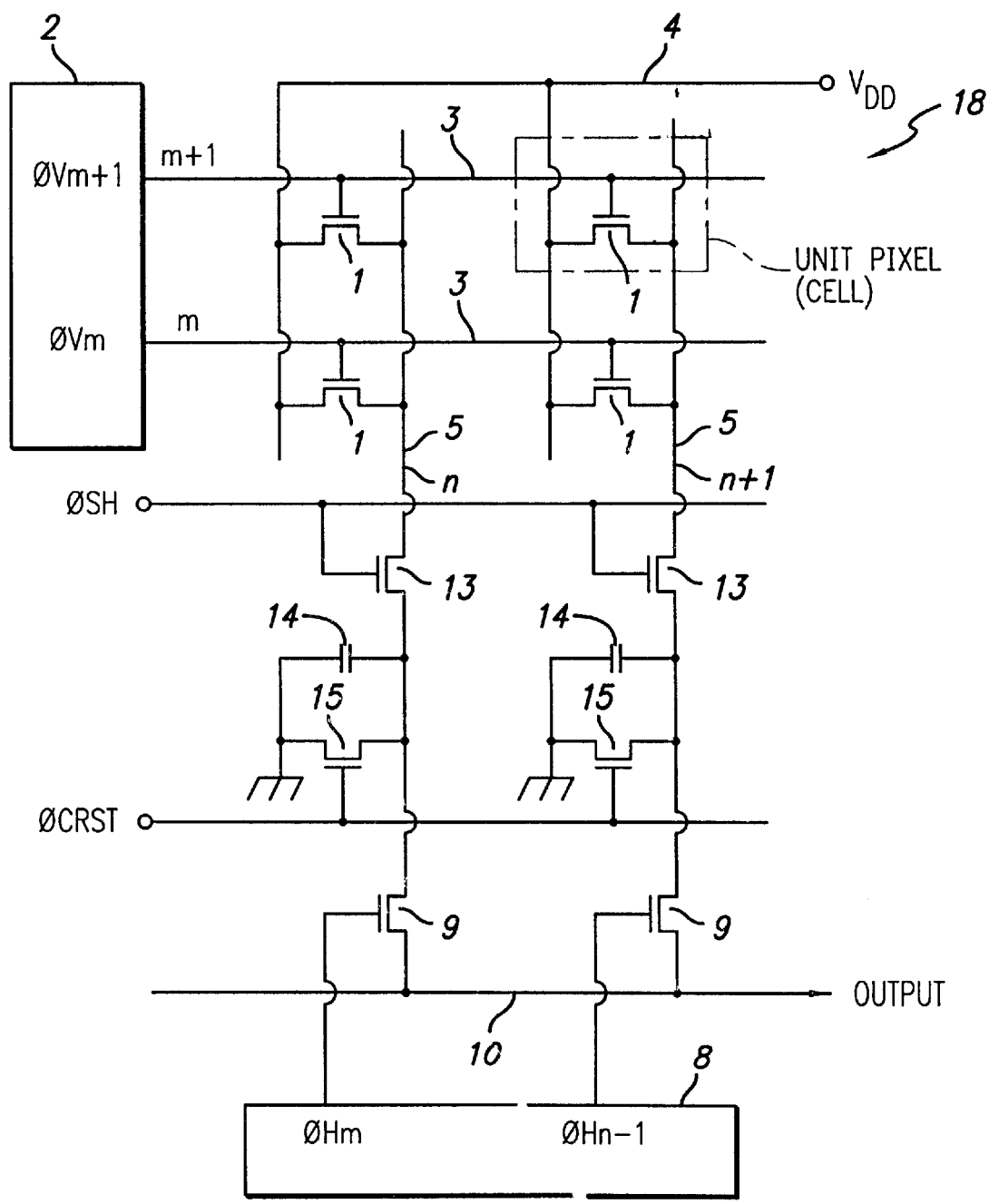
FIG. 3 is a schematic diagram showing an amplifier type solid-state imaging device according to a first embodiment of the present invention.

FIG. 3 shows an amplifier type solid-state imaging device of a capacitor load operation system according to a first embodiment of the present invention.

In FIG. 3, reference numeral 1 depicts a pixel MOS transistor constructing a unit pixel (cell). There are provided a plurality of pixel MOS transistors 1 which are arrayed in a matrix fashion. Reference numeral 2 depicts a vertical scanning circuit formed of a shift register or the like. Reference numeral 3 depicts a vertical scanning line connected to the gate of the pixel MOS transistor 1 and to the vertical scanning circuit 2.

The source of the pixel MOS transistor 1 is connected to the vertical signal line 5 and the drain thereof is connected to a power supply line 4 to which a voltage $V_{DD}$ is supplied.

A load capacitor element (load capacitor) 14 for holding a signal voltage (electric charge) is connected through an operation MOS switch 13 to the vertical signal line 5. Specifically, the load capacitor element 14 is connected between the vertical signal line 5 and a first potential, i.e. ground potential in this embodiment. An operation pulse $\phi_{SH}$ is applied to the gate of the operation MOS switch 13.

A load capacitor reset MOS switch 15 is connected to the load capacitor element 14 in parallel to each other and a reset pulse $\phi_{CRST}$ is applied to the gate of the load capacitor reset MOS switch 15.

The load capacitor element 14 is connected to the drain of a horizontal MOS switch 9 and the source of the horizontal MOS switch 9 is connected to a horizontal signal line 10.

The capacitance of the load capacitor element 14 is set to be equivalent to or greater than the capacitance of the vertical signal line 5.

In FIG. 3, reference numeral 8 depicts a horizontal scanning circuit formed of a shift register or the like. The horizontal scanning circuit 8 sequentially supplies horizontal scanning signals (pulse voltages) $\phi_H$ ($\phi_{H1} \cdots \phi_{Hn}$, $\phi_{Hn+1}, \ldots$) to the gate of the horizontal MOS switch 9 connected to the horizontal signal line 5 thereby to supply the signal charge held in the load capacitor element 14 through the horizontal signal line 10 to the output circuit.

Figure 6:
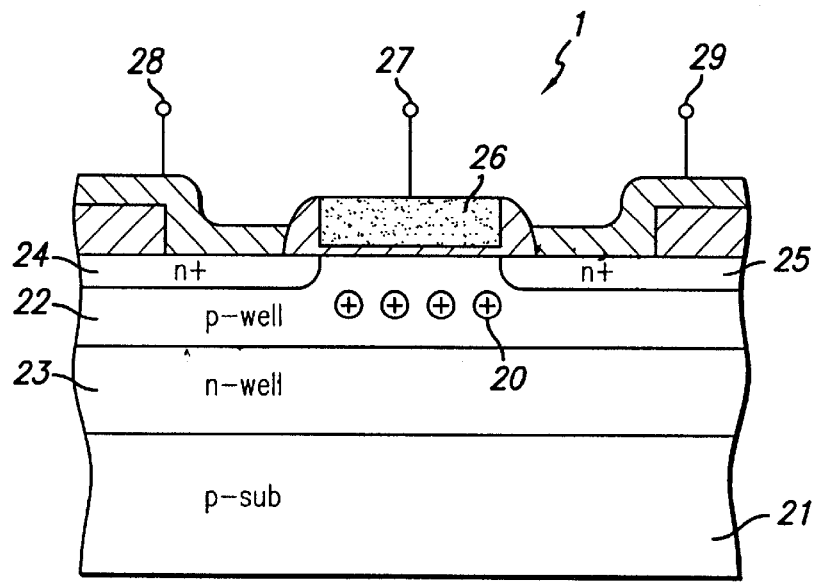
FIG. 6 is a cross-sectional view showing a semiconductor structure of a pixel MOS transistor.

FIG. 6 is a cross-sectional view showing a semiconductor structure of the unit pixel (i.e., pixel MOS transistor) 1.

In FIG. 6, reference numeral 21 depicts a first conductivity type, e.g., p-type semiconductor substrate, reference numeral 22 depicts a p-type well region in which photoelectrically-converted signal charges, i.e. holes 20 in this embodiment are accumulated, and reference numeral 23 depicts a second conductivity type, i.e., n-type well region. N$^+$ type source region 24 and drain region 25 are formed on the p-type well region 22 and a gate electrode 26 formed of a transparent thin film polycrystalline silicon is formed on the p-type well region 22 formed between the two regions 24 and 25 through a gate insulating film. The holes 20 thus photoelectrically-converted and accumulated in the p-type well region 22 formed beneath the gate electrode 26 control a channel current (drain current) used when a signal voltage is read out from the pixel MOS transistor 1, which will be described later on, and the changed amount of the channel current becomes the signal output.

In the above-mentioned amplifier type solid-state imaging device, during the horizontal blanking period in which a signal voltage is read out from the pixel MOS transistor 1, the load capacitor element 14 is held at a potential, i.e. voltage which is equivalent to a channel potential corresponding to an amount of signal charges accumulated in each pixel MOS transistor 1. This voltage is output from the horizontal signal line 10 through the horizontal MOS switch 9 scanned by the horizontal scanning circuit 8.

Figure 4:
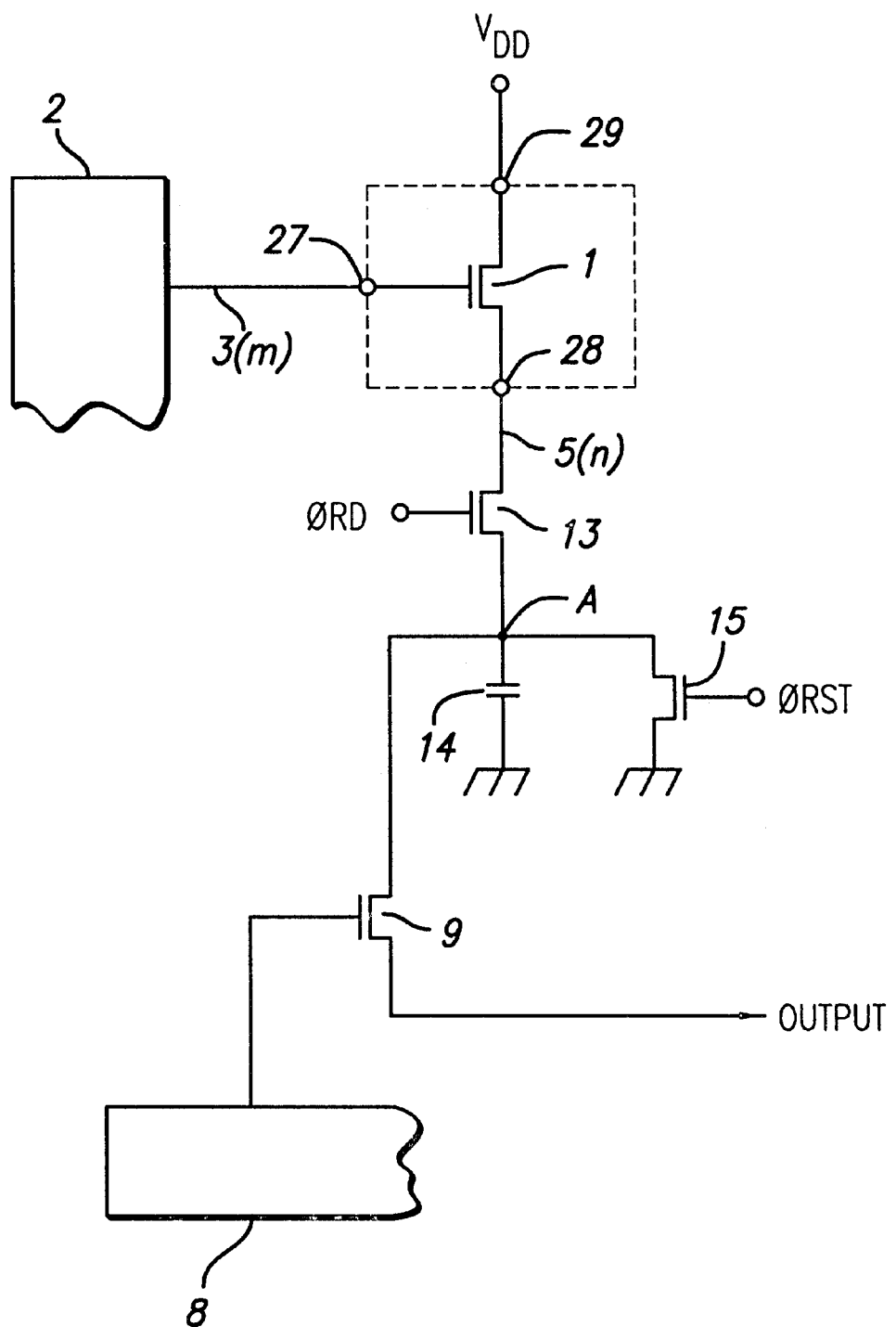
FIG. 4 is a diagram of an equivalent circuit used to explain operation of the amplifier type solid-state imaging device shown in FIG. 3.
Figure 5:
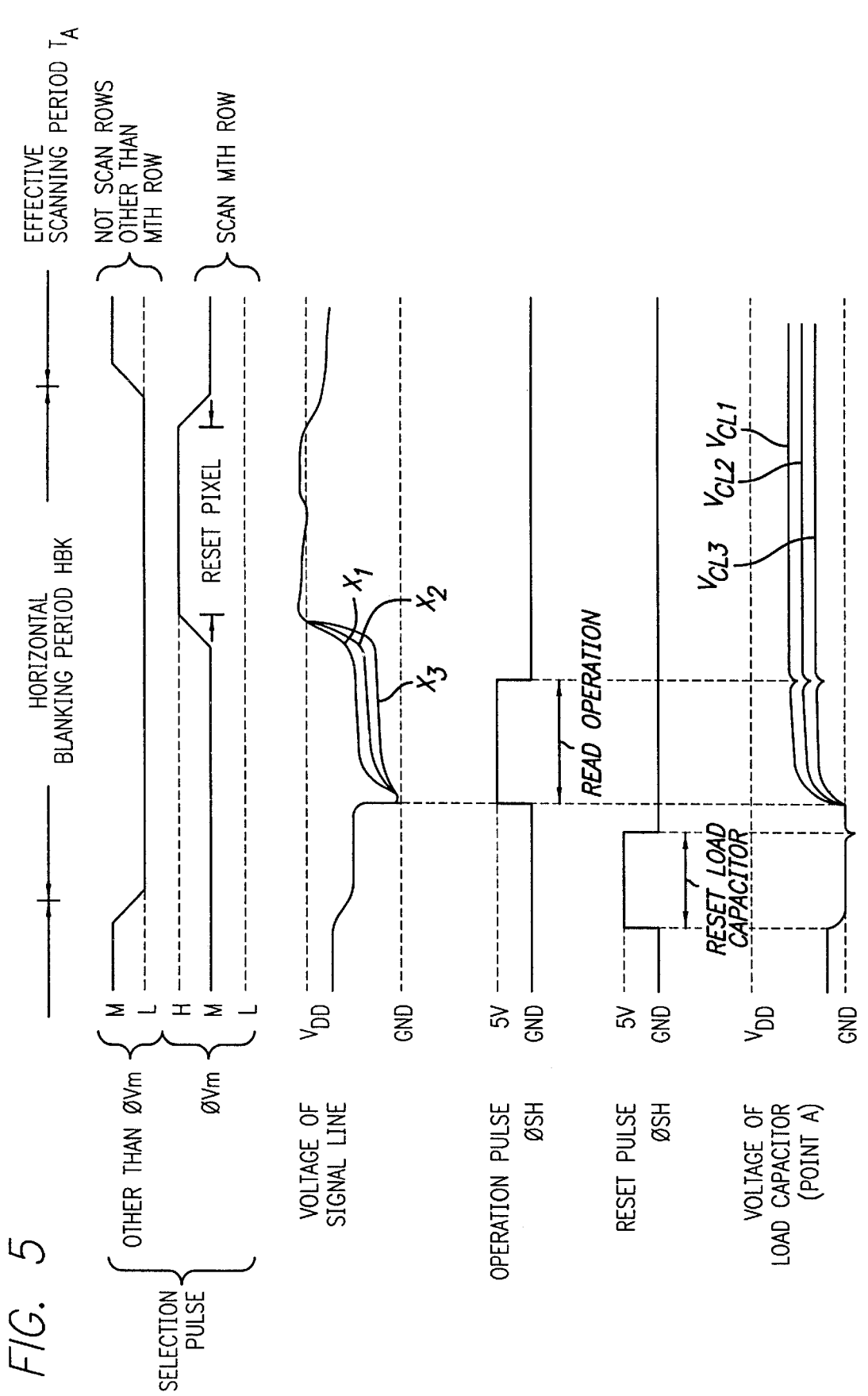
FIG. 5 is a timing chart used to explain operation of the amplifier type solid-state imaging device shown in FIG. 3.

FIG. 4 shows an equivalent circuit used to explain operation of the pixel MOS transistor 1 serving as the pixel unit, and FIG. 5 is a timing chart thereof.

As shown in FIG. 4, a gate terminal 27 of the pixel MOS transistor 1 is connected through the vertical scanning line 3 to the vertical scanning circuit 2, and a drain terminal 29 thereof is connected to the voltage $V_{DD}$. A source terminal 28 of the pixel MOS transistor 1 is connected to the vertical signal line 5 and the vertical signal line 5 is connected through an operation MOS switch 15 to the load capacitor element 14. A junction between the load capacitor element 14 and the operation MOS switch 13 is connected to the load capacitor reset MOS switch 15 and the horizontal MOS switch 9.

Operation for reading out a signal voltage from the pixel MOS transistor 1 will be described below. Vertical scanning signals (vertical scanning line pulses) $\phi_V$ ($\phi_{V1}, \ldots \phi_{Vm}$, $\phi_{Vm+1}, \ldots$) from the vertical scanning circuit 2 are sequentially applied to the scanning lines 3 of every rows to thereby sequentially scan the pixel MOS transistors 1 of every rows. Specifically, as shown in FIG. 5, the scanning line 3 of the mth row, for example, connected to the gate terminal 27 of the pixel MOS transistor 1, is held at a voltage M during the horizontal blanking period HBK with the result that the pixel MOS transistor 1 of the mth row can be selected.

The potential of the scanning line 3 corresponding to a row which is not selected is held at a voltage L during the horizontal blanking period HBK. Therefore, the pixel MOS transistor 1 of other row connected to the scanning line 3 is not selected.

Then, the load capacitor reset MOS switch 15 is placed in the ON state by the reset pulse $\phi_{CRST}$, and the load capacitor element 14 used in the reading operation is reset to a predetermined voltage, i.e. a ground voltage GND in this embodiment.

When the operation voltage $\phi_{SH}$ is applied to the gate of the operation MOS transistor 13, the operation MOS transistor 13 is turned on and the vertical signal line 5 and the load capacitor element 14 which was already reset are connected.

The moment the operation MOS switch 13 is turned on, the load capacitor element 14 starts accumulating electric charges and the load capacitor element 14 is held at a voltage that is equivalent to the channel potential corresponding to the amount of signal charges (holes) accumulated in the pixel MOS transistor 1 during the read operation period.

In FIG. 5, voltages $X_1$, $X_2$ and $X_3$ of the vertical signal line 5 depict a voltage obtained when light incident on the pixel MOS transistor 1 is high in intensity, a voltage obtained when light incident on the pixel MOS transistor 1 is low in intensity and a voltage obtained when light incident on the pixel MOS transistor 1 is zero in intensity, respectively. Further, voltages $V_{CL1}$, $V_{CL2}$ and $V_{CL3}$ of the load capacitor element 14 depict a voltage obtained when light incident on the pixel MOS transistor 1 is high in intensity, a voltage obtained when light incident on the pixel MOS transistor 1 is low in intensity and a voltage obtained when light incident on the pixel MOS transistor 1 is zero in intensity, respectively.

When the operation MOS switch 13 is turned off, the voltage corresponding to the channel potential, i.e. the signal voltage is held in the load capacitor element 14 as it is. The signal voltage (electric charge) held in the load capacitor element 14 flows to the horizontal signal line 10 when the horizontal MOS switch 9 is turned on by the scanning signals $\phi_H$ ($\phi_{H1}, \ldots \phi_{Hn}, \phi_{Hn+1}, \ldots$) during an effective scanning period $T_A$.

To the output terminal of the horizontal signal line 10 is connected an output circuit, such as a load resistance element, a charge detecting circuit or the like, though not shown, and the signal charge is detected from the output terminal of the horizontal signal line 10 as the signal voltage.

In the case of the ordinary solid-state imaging device (image sensor), once the signal voltage is read out, the solid-state imaging device has to be reset and the pixel MOS transistor 1 has to start accumulating new signal charges. Therefore, at the completion of the reading operation, i.e. at the end of the horizontal blanking period HBK, the gate voltage of the pixel MOS transistor 1 is held at high level or the gate voltage of the pixel MOS transistor 1 is held at high level and the substrate voltage is held at low level or only the substrate voltage is held at low level, whereby accumulated old signal charges (holes) 20 are discharged to the substrate 21 side.

According to the amplifier type solid-state imaging device 18, when the signal voltage corresponding to the channel potential of the pixel MOS transistor 1 is held in the load capacitor element 14, almost no current flows to the vertical signal line 5. Therefore, it is possible to obtain uniform sensitivity without a large influence being exerted by the resistance of the vertical signal line 5.

Figure 1:
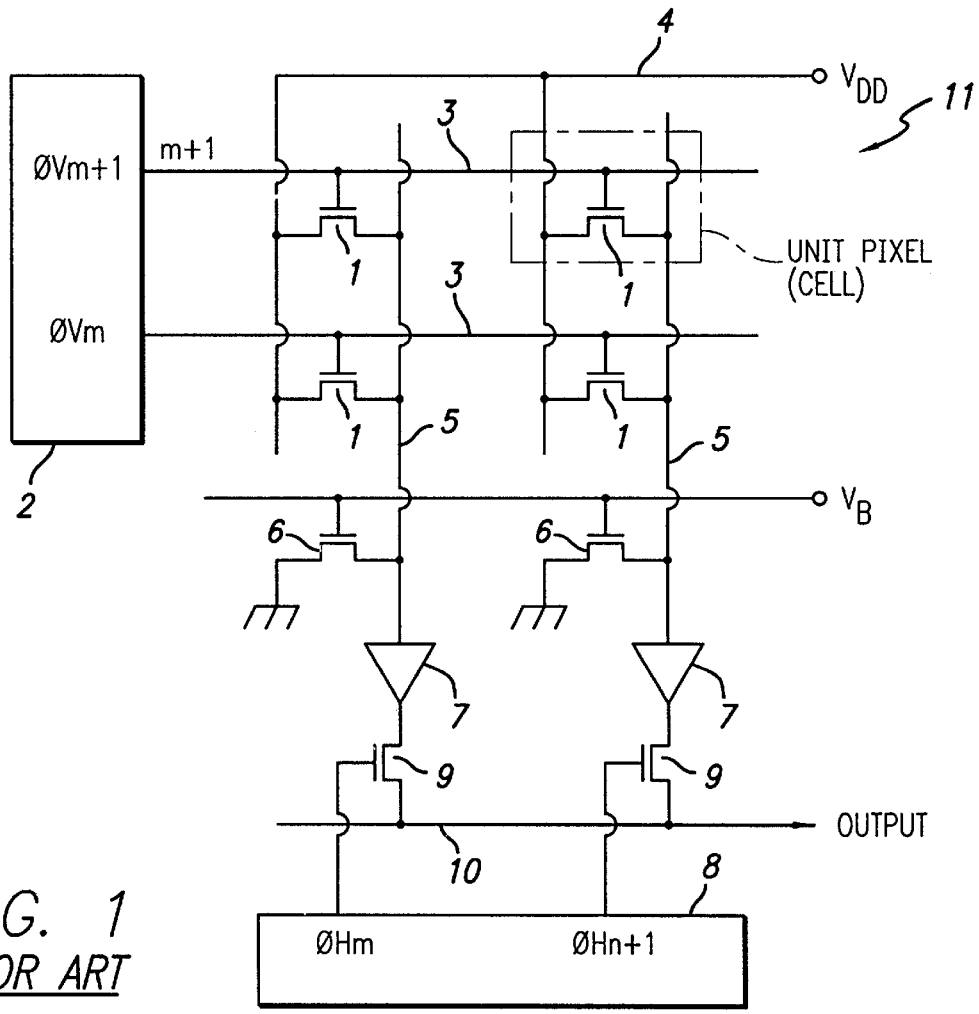
FIG. 1 is a schematic diagram showing a comparative example of an amplifier type solid-state imaging device.
Figure 2:
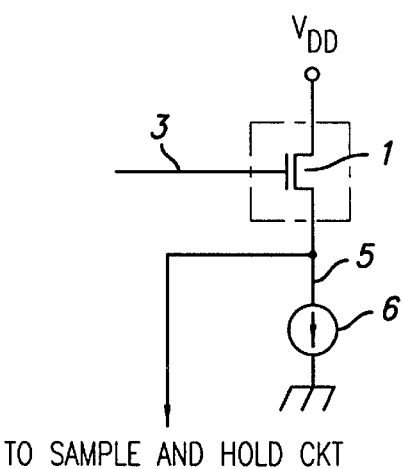
FIG. 2 is a diagram of an equivalent circuit of the amplifier type solid-state imaging device and to which reference will be made in explaining operation of a pixel MOS transistor.

Since the load is the capacitor element 14, the fluctuation of the MOS transistor is small unlike the load MOS transistor 6 shown in FIG. 1, and it is difficult for the vertical stripe-shaped fixed pattern noise (FPN) to occur.

Moreover, since the channel potential of the pixel MOS transistor 1 directly becomes the voltage held in the load capacitor element 14, sensitivity can be improved as compared with the case that the pixel MOS transistor 1 is driven in the stationary state, i.e., under the condition that a constant current flows to the channel of the pixel MOS transistor 1 by using the load MOS transistor 6.

Further, since no steady-state current flows to the pixel MOS transistor 1, it is possible to reduce the power consumption.

Furthermore, since the capacitance of the load capacitor element 14 is set to be equal to or greater than the capacitance of the vertical signal line 5, a so-called KTC noise can be reduced. The KTC noise is a noise proportional to a product of the Boltzmann constant K, an absolute temperature T and a capacitance C. Therefore, it is possible to obtain a solid-state imaging device with satisfactory S/N (signal-to-noise ratio).

On the other hand, in order for the amplification solid-state imaging device to carry out a practical capacitor load operation, it is necessary to reset the vertical signal line 5 together with the load capacitor element 14. The reason for this will be described later on.

Figure 7:
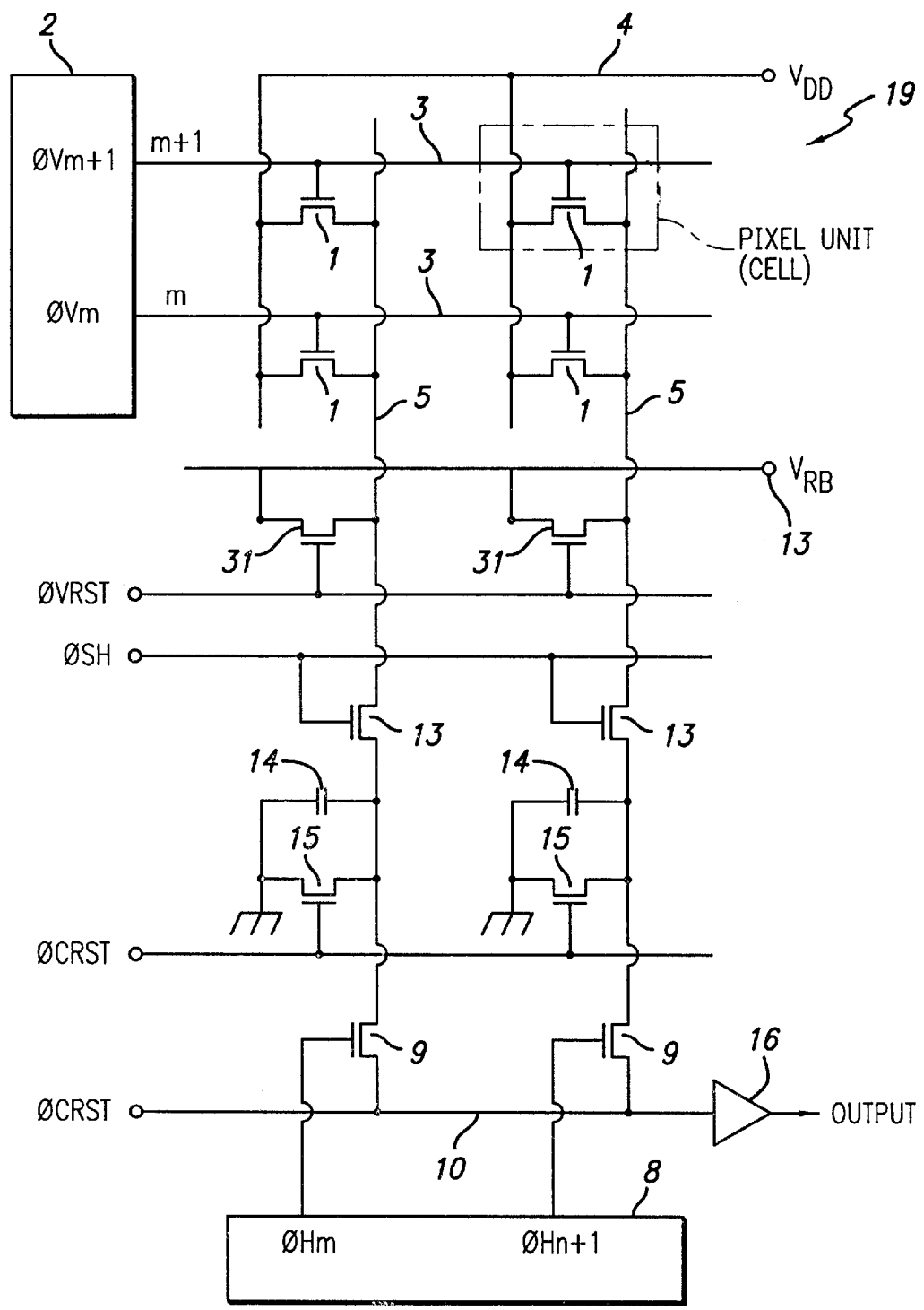
FIG. 7 is a schematic diagram showing an amplifier type solid-state imaging device according to a second embodiment of the present invention.

FIG. 7 shows an amplifier type solid-state imaging device according to a second embodiment of the present invention in which the load capacitor element 14 and the vertical signal line 5 include reset MOS switches. In FIG. 7, like parts corresponding to those of FIG. 3 are marked with the same references and therefore need not be described in detail. As shown in FIG. 7, the amplifier type solid-state imaging device 19 according to this embodiment includes a vertical signal line reset MOS switch 31 connected to the vertical signal line 5 on the side of the operation MOS switch 13 adjacent the vertical signal line 5. Specifically, the source of the vertical signal line reset MOS switch 31 is connected to the vertical signal line 5 and the drain thereof is connected to a reset bias terminal 32 of a reset bias voltage $V_{RB}$. A reset pulse $\phi_{VRST}$ is supplied to the gate of the vertical signal line reset MOS switch 31. In FIG. 7, reference numeral 16 depicts an output circuit, such as a load resistance element, a charge detecting circuit or the like connected to the output terminal of the horizontal signal line 10. The remainder of the arrangement shown in FIG. 7 is similar to that of FIG. 3.

Figure 8:
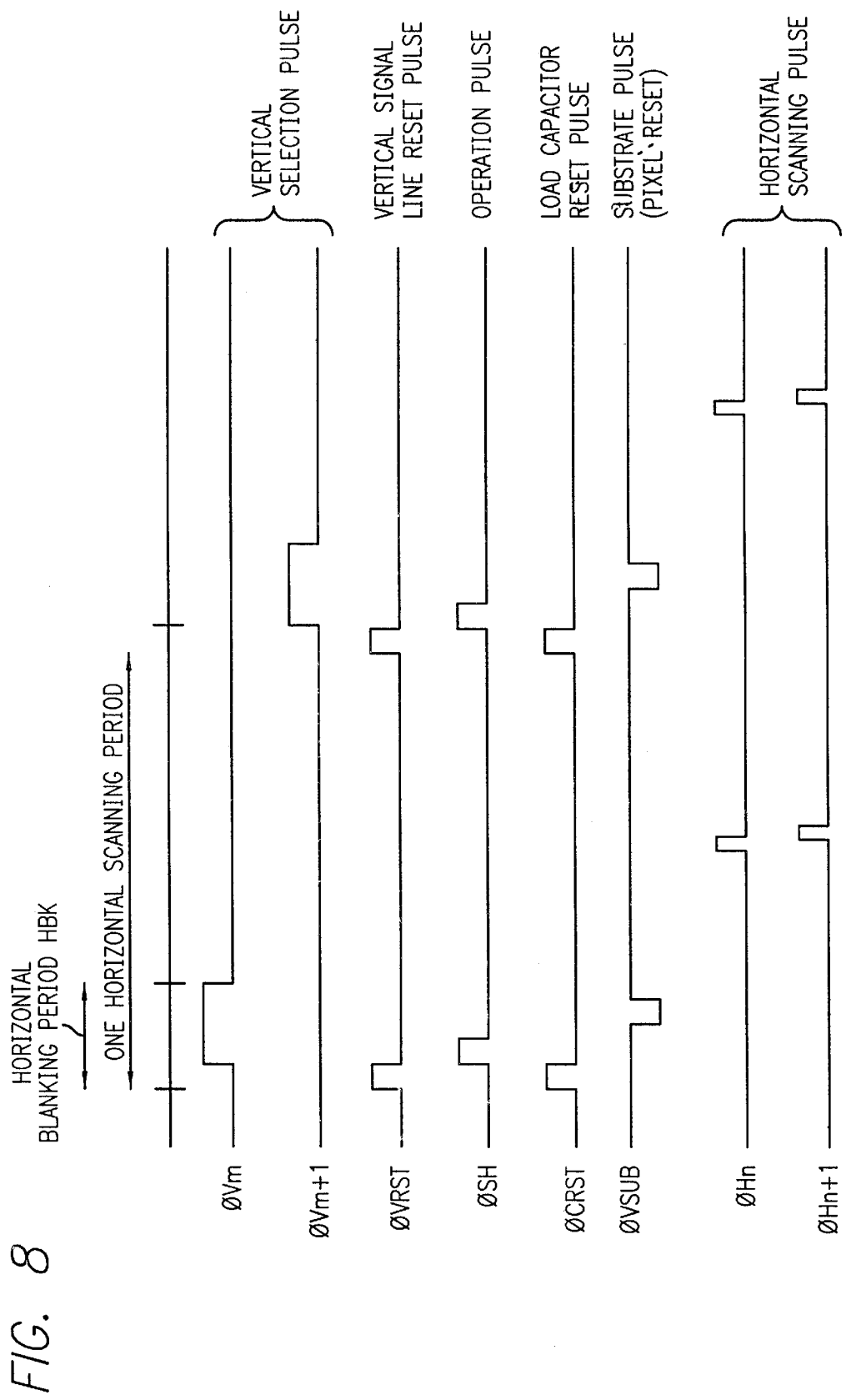
FIG. 8 is a timing chart used to explain operation of the amplifier type solid-state imaging device shown in FIG. 7.

FIG. 8 is a timing chart of the amplifier type solid-state imaging device 19 according to the second embodiment of the present invention. As shown in FIG. 8, the vertical signal line reset pulse $\phi_{VRST}$ and the load capacitance reset pulse $\phi_{CRST}$ are simultaneously applied to the gate of the vertical signal line reset MOS switch 31 and the gate of the load capacitor reset MOS switch 15 before the operation period of the pixel MOS transistor 1 in the horizontal blanking period HBK to thereby turn on the two reset MOS switches 31 and 15 so that the initial value of the vertical signal line 5 is reset to the voltage $V_{RB}$ and that the initial voltage of the load capacitor element 14 is reset to the ground potential GND.

Thereafter, the pixel MOS transistor 1 is selected by the vertical scanning line pulses $\phi_V$ (. . . $\phi_{Vm}$, $\phi_{Vm+1}$, . . . ) supplied from the vertical scanning circuit 2 during the operation period of the pixel MOS transistor 1 similarly as described before. Simultaneously, the operation MOS switch 13 is turned on by the operation pulse $\phi_{SH}$, whereby the signal voltage from the pixel MOS transistor 1 is held in the load capacitor element 14. At the end of the horizontal blanking period HBK, a substrate pulse $\phi_{VSUB}$ is applied to the substrate, for example, whereby the signal charges accumulated in the pixel MOS transistor 1 that was read once are discharged to the substrate side. Then, during the horizontal scanning period, the horizontal MOS switch 9 is sequentially turned on by the horizontal scanning signals $\phi_H$ ( . . . , $\phi_{Hn}$, $\phi_{Hn+1}$, . . . ) supplied from the horizontal scanning circuit 8, whereby the signal voltage held in the load capacitor element 14 flows to the horizontal signal line 10 and is then output through the output circuit 16 as the signal charge.

The amplifier type solid-state imaging device 19 shown in FIG. 7 comprises three switching MOS transistors in total composed of the operation MOS switch 13 for operating the pixel MOS transistor 1 in a capacitor load operation fashion, the vertical signal line reset MOS switch 31 for resetting the potential of the vertical signal line 5 and the load capacitor reset MOS switch 15 for resetting the load capacitor element 14 to thereby reset the vertical signal line 5 and the load capacitor element 14 separately. However, the above-mentioned arrangement is not reasonable when it is intended to simplify the arrangement of the horizontal output circuit portion and to reduce the area of the solid state imager chip.

Figure 9:
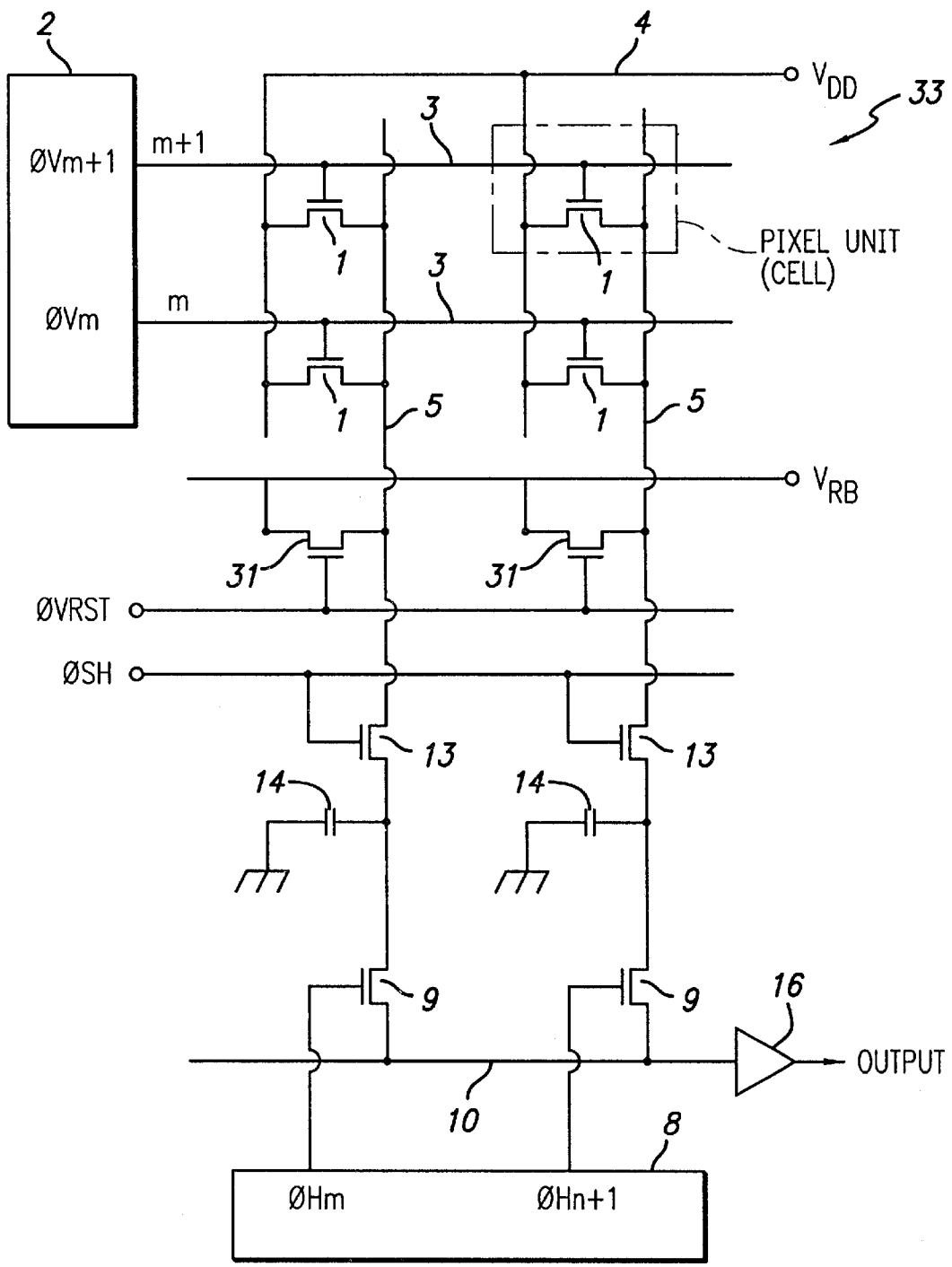
FIG. 9 is a schematic diagram showing an amplifier type solid-state imaging device according to a third embodiment of the present invention.

FIG. 9 shows a third embodiment of the present invention in which the above-mentioned disadvantage can be obviated.

In FIG. 9, like parts corresponding to those of FIG. 7 are marked with the same references and therefore need not be described in detail. As shown in FIG. 9, in an amplifier type solid-state imaging device 33 according to this embodiment, there are provided a plurality of pixel MOS transistors 1 which are arrayed in a matrix fashion. The gate of the pixel MOS transistor 1 is connected to the vertical scanning line 3 scanned by the vertical scanning circuit 2, the drain thereof is connected to the power supply line 4 and the source thereof is connected to the vertical signal line 5 in FIG. 9, reference numeral 8 depicts the horizontal scanning circuit, 9 the horizontal MOS switch, 10 the horizontal signal line and 16 the output circuit connected to the horizontal signal line 10, respectively.

According to this embodiment in particular, the load capacitor element 14 for holding the signal voltage is connected through the operation MOS switch 13 to the vertical signal line 5, and the vertical signal line reset MOS switch 31 also serving to reset the load capacitor element 14 is connected to the vertical signal line 5 at the operation MOS switch 13 adjacent the vertical signal line 5. The source of the reset MOS switch 31 is connected to the vertical signal line 5, the drain thereof is connected to a reset bias terminal 32 to which the reset bias voltage $V_{RB}$ is applied, and the gate thereof is supplied with the reset pulse $\phi_{VRST}$. On the other hand, the load capacitor element 14 is connected between the vertical signal line 5 and the first potential, i.e., the ground potential in this embodiment. The operation pulse $\phi_{SH}$ is applied to the gate of the operation MOS switch 13.

The reset potential of the load capacitor element 14, i.e., reset bias voltage $V_{RB}$ is set to be shallower than the channel potential generated from the pixel MOS transistor 1 when no light becomes incident on the pixel MOS transistor 1. Also, the potential difference between the reset bias voltage $V_{RB}$ and the channel potential obtained in the pixel MOS transistor 1 when no light becomes incident on the pixel MOS transistor 1 is set so as to fall within 2.0V.

The capacitance of the load capacitor element 14 is set to be equal to or greater than the capacitance of the vertical signal line 5 .

Operation of the amplifier type solid-state imaging device 33 according to the third embodiment of the present invention will be described below with reference to a timing chart of FIG. 10.

Initially, the vertical signal line 5 and the load capacitor element 14 are reset to the vertical signal line reset bias voltage $V_{RB}$ before the operation period $T_B$ of the pixel MOS transistor 1, i.e., during the period $T_C$ in the horizontal blanking period HBK. Specifically, in this operation, the vertical signal line reset pulse $\phi_{VRST}$ and the operation pulse $\phi_{SH}$ that are respectively applied to the vertical signal line reset MOS switch 31 and the operation MOS switch 13 are held at a high level so that the vertical signal line reset MOS switch 31 and the operation MOS switch 13 are turned on simultaneously.

As a consequence, the initial voltages generated from the vertical signal line 5 and the load capacitor element 14 before the operation period $T_B$ of the pixel MOS transistor 1 are set to the vertical signal line reset bias voltage $V_{RB}$.

Thereafter, after the vertical signal line reset pulse $\phi_{VRST}$ is returned to the low level, the vertical scanning line pulse, e.g., the pulse $\phi_{Vm}$ applied to the vertical scanning line 3 of the mth row is set to the high level in order to activate the pixel MOS transistor 1.

At that time, the operation pulse $\phi_{SH}$ is kept at the high level.

At this timing point, signal voltages corresponding to one column amount of the pixel MOS transistors 1 connected to the vertical scanning line 3 of the mth row are held in the load capacitor elements 14, respectively. During a reset period $T_D$ of the pixel MOS transistor 1 at the end of the horizontal blanking period HBK, the substrate pulse $\phi_{VSUB}$ is applied to the substrate, for example, and signal charges accumulated in the pixel MOS transistor 1 are discharged to the substrate side.

The signal charges held in the load capacitor elements 14 flow to the horizontal signal line 10 as signal charges by sequentially energizing the horizontal MOS switches 9 by the horizontal scanning signals $\phi_H$ ( . . . $\phi_{Hn}$, . . . $\phi_{Hn+1}$, . . . ) from the horizontal scanning circuit 8 during the horizontal scanning period, are amplified by the output circuit (e.g., charge detecting circuit) 16 and are then output.

The reason that the vertical signal line 5 and the load capacitor element 14 have to be reset in the capacitor load operation will be described below. The initial voltages generated from the vertical signal line 5 and the load capacitor element 14 when the pixel MOS transistor 1 is activated affect the signal voltages obtained after the operation of the pixel MOS transistor 1 is ended. Therefore, the vertical signal line 5 and the load capacitor element 14 have to be reset without fail, which will be described below with reference to FIG. 11.

Figure 11:
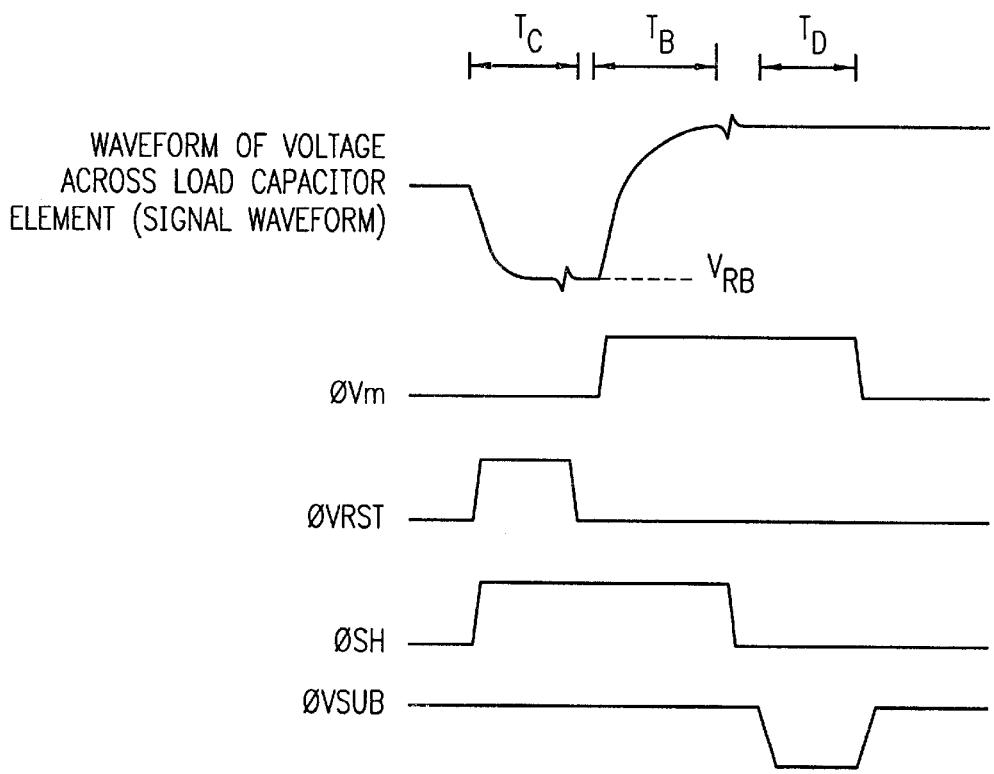
FIG. 11 is a diagram of waveforms of signals appearing in the load capacitor element.

Study of FIG. 11 reveals that, although the source voltage (=vertical signal line voltage=voltage across the load capacitor element) of the pixel MOS transistor 1 is raised to be higher than the initial voltage of the vertical signal line reset bias voltage $V_{RB}$ during the operation period $T_B$ of the pixel MOS transistor 1, the voltage across the load capacitor element 14 does not reach the steady-state even at the end of the operation period $T_B$, and is being increased.

Although the voltage across the load capacitor element 14 can be stabilized to the steady-state with a sufficient period of time, the voltage across the load capacitor element 14 cannot sufficiently reach the steady-state during the operation period of the pixel MOS transistor 1 in the horizontal blanking period HBK. Therefore, the initial voltage of the vertical signal line obtained before the pixel MOS transistor 1 is energized affects the hold level (i.e., signal voltage) in FIG. 11 considerably.

According to the amplifier type solid-state imaging device 33, the load capacitor reset MOS switch 15 can be reduced as compared with the solid-state imaging device 19 shown in FIG. 7, whereby the arrangement of the horizontal output circuit portion can be simplified and the area of the solid-state imaging chip can be reduced.

Simultaneously, the input terminal of the load capacitor reset MOS switch 15 can be removed and the number of terminal pins can be reduced.

As the number of the reset MOS switches connected to the vertical signal line 5 is reduced, the interconnection length can be reduced and a crosstalk from the adjacent pixel can be reduced.

Since the reset potential of the load capacitor element 14, i.e. reset potential $V_{RB}$, is set to be shallower than the channel potential obtained in the pixel MOS transistor 1 when no light becomes incident on the pixel MOS transistor 1, and the potential difference between it and the channel potential obtained in the pixel MOS transistor 1 when no light becomes incident on the pixel MOS transistor 1 is set so as to fall within 2.0V, when the voltage equivalent to the channel potential corresponding to the signal charge of the pixel MOS transistor 1 is held in the load capacitor element 14 through the operation MOS switch, it is possible to alleviate the influence of the jitter component and the potential of the load capacitor element 14 can be readily stabilized to the signal voltage.

Furthermore, since the capacitance of the load capacitor element 14 is set to be equal to or greater than the capacitance of the vertical signal line 5, the KTC noise can be reduced and the S/N can be made satisfactory.

Figure 12:
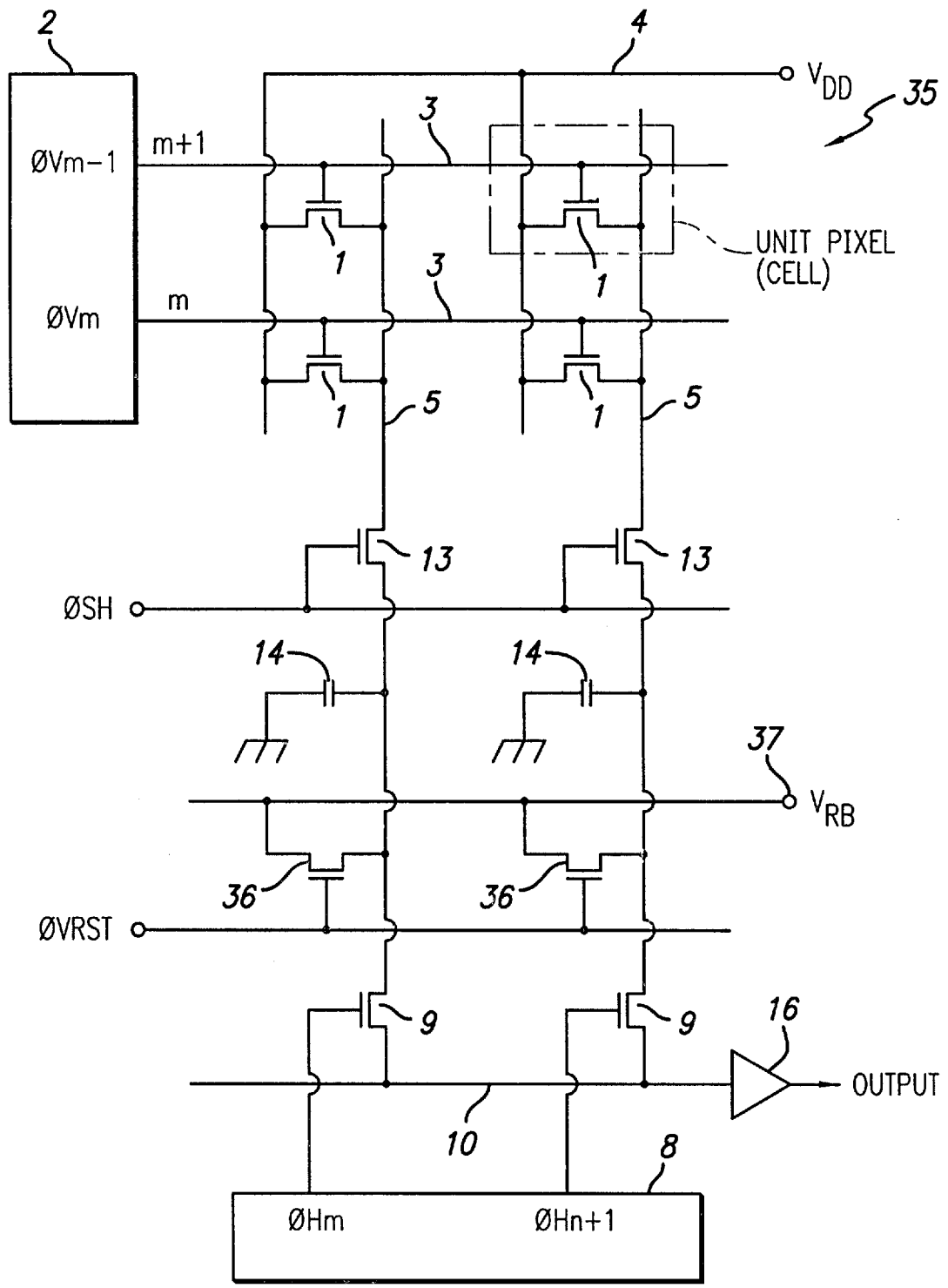
FIG. 12 is a schematic diagram showing an amplifier type solid-state imaging device according to a fourth embodiment of the present invention.

FIG. 12 shows an amplifier type solid-state imaging device according to a fourth embodiment of the present invention. In FIG. 12, like parts corresponding to those of FIG. 7 are marked with the same references and therefore need not be described in detail.

As shown in FIG. 12, in an amplifier type solid-state imaging device 35, there are provided a plurality of pixel MOS transistors 1 which are arrayed in a matrix fashion. The gate of the pixel MOS transistor 1 is connected to the vertical scanning line 3 scanned by the vertical scanning circuit 2, the drain thereof is connected to the power supply line 4 and the source thereof is connected to the vertical signal line 5.

In FIG. 12, reference numeral 8 depicts the horizontal scanning circuit, 9 the horizontal MOS switch, 10 the horizontal signal line and 16 the output circuit connected to the horizontal signal line 10.

In this embodiment, in particular, the load capacitor element 14 for holding the signal voltage is connected through the operation MOS switch 13 to the vertical signal line 5, and a load capacitor reset MOS switch 36 also serving to reset the vertical signal line 5 is connected to the vertical signal line 5 through the switch 13 and is disposed near the load capacitor element 14 at the side rather than the of the switch 13 adjacent capacitor 14.

The source of the reset MOS switch 36 is connected to the vertical signal line 5, the drain thereof is connected to a reset bias terminal 37 to which the reset bias voltage $V_{RB}$ is supplied and the gate thereof is supplied with the reset pulse $\phi_{VRST}$. On the other hand, the load capacitor element 14 is connected between the vertical signal line 5 and the first potential, i.e., ground potential in this embodiment. The operation pulse $\phi_{SH}$ is applied to the gate of the operation MOS switch 13.

Also in this case, the reset potential, i.e., the reset bias voltage $V_{RB}$ is set to be shallower than the channel potential obtained in the pixel MOS transistor 1 when no light becomes incident on the pixel MOS transistor 1, and the potential difference between it and the channel potential obtained in the pixel MOS transistor 1 when no light becomes incident on the pixel MOS transistor 1 is set so as to fall within 2.0V.

The capacitance of the load capacitor element 14 is set to be equal to or greater than the capacitance of the vertical signal line 5.

Figure 10:
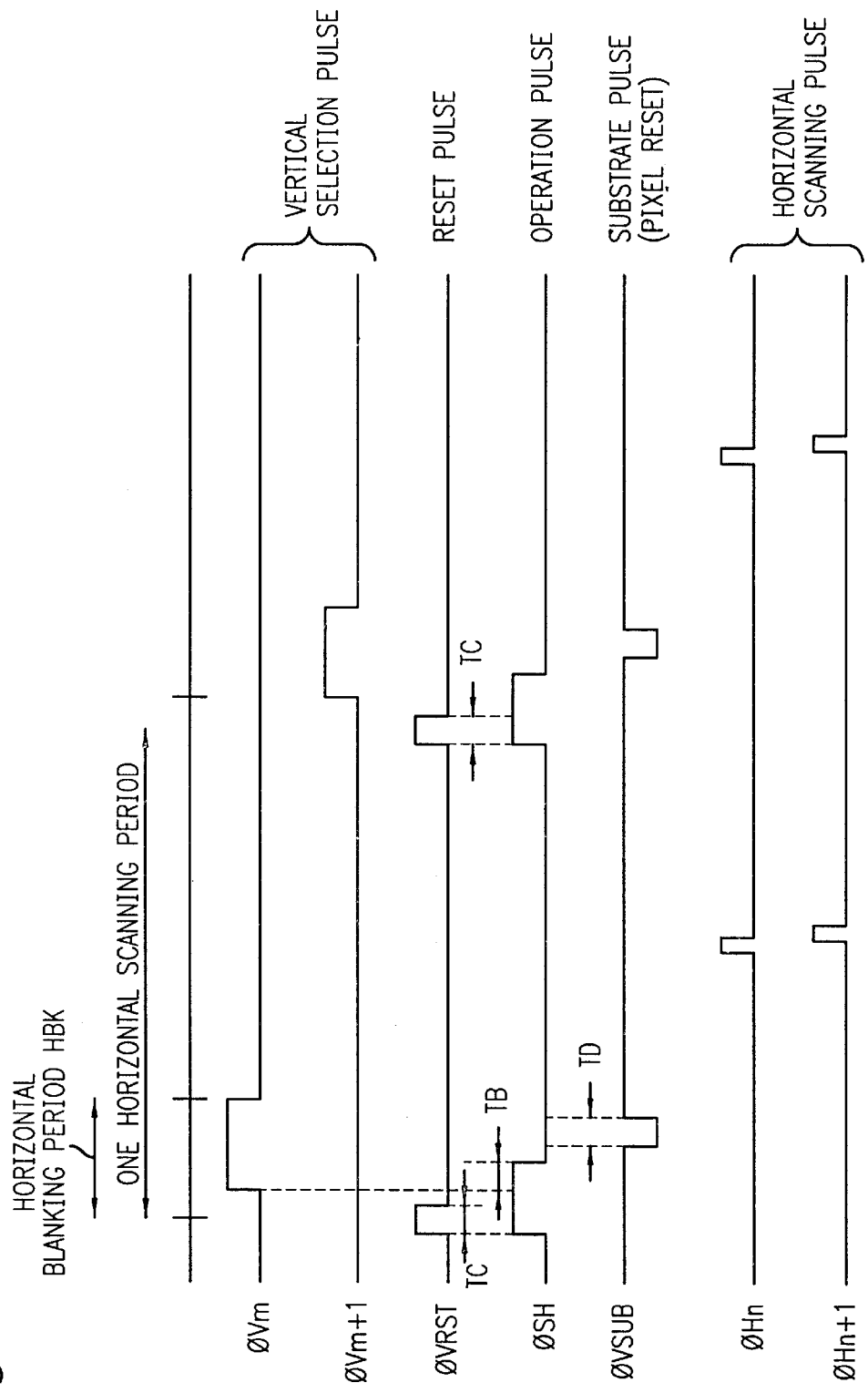
FIG. 10 is a timing chart used to explain operation of the amplifier type solid-state imaging device shown in FIG. 9.

An operation timing and a pulse voltage of the amplifier type solid-state imaging device 35 are the same as those of FIG. 10. Specifically, before the operation period $T_B$ of the pixel MOS transistor 1 in the horizontal blanking period HBK, i.e., during the period $T_C$, the reset MOS switch 36 and the operation MOS switch 13 are both turned on by the reset pulse $\phi_{VRST}$ and the operation pulse $\phi_{SH}$ and the vertical signal line 5 and the load capacitor element 14 are simultaneously reset so that the initial voltages generated from the vertical signal line 5 and the load capacitor element 14 before the operation period $T_B$ of the pixel MOS transistor 1 are set to the reset bias voltage $V_{RB}$.

Thereafter, similarly as described before, the pixel MOS transistor 1 is scanned. After the operation period $T_B$ of the pixel MOS transistor 1 is ended, the operation MOS switch 13 is turned off so that the signal voltage from the pixel MOS transistor 1 is held in the load capacitor element 14. Then, the horizontal MOS switch 9 is sequentially turned on to output the signal voltage of the load capacitor element 14 through the horizontal signal line 10.

According to the arrangement of the solid-state imaging device 35, the load capacitor element 14 is connected through the operation MOS switch 13 to the vertical signal line 5 and the reset MOS switch 36 is connected to the load capacitor element 14 at the side, of the switch 13 adjacent capacitor 14 whereby the reset speed of the load capacitor element 14 can be increased. Therefore, it is possible to set the signal voltage to the reset bias voltage $V_{RB}$ more stably.

When the capacitor is reset by the MOS switch, the reset speed is affected by the channel resistance of the MOS switch. While the load capacitor element 14 is reset to the reset bias voltage $V_{RB}$ by the two MOS switches 31 and 13 in the aforesaid arrangement shown in FIG. 9, according to the arrangement of the solid-state imaging device 35 of the fourth embodiment of the present invention, the load capacitor element 14 with large capacitance is reset to the reset bias voltage $V_{RB}$ via one MOS switch 36 so that the reset speed can be increased as compared with FIG. 9, so that the reset potential of the load capacitor element 14 is settled more stably.

On the other hand, although the vertical signal line 5 is reset by the two MOS switches 36 and 13, the capacitance of the vertical signal line 5 is too small to cause the above-mentioned problem.

Also, in the solid-state imaging device 35 according to this embodiment, it is sufficient to provide one reset MOS switch 36. Therefore, the arrangement of the horizontal output circuit portion can be simplified. Also, it becomes possible to reduce the area of the solid state imaging chip. Further, since the number of the reset MOS switches is reduced, the number of the terminal pins can be reduced and the interconnection length can be reduced. Therefore, it becomes possible to reduce the crosstalk component generated from an adjacent pixel.

Further, since the reset potential of the load capacitor element 14, i.e., the reset voltage $V_{RB}$ is set to be shallower than the channel potential obtained in the pixel MOS transistor 1 when no light becomes incident on the pixel MOS transistor 1 and the potential difference between it and the channel potential generated in the pixel MOS transistor 1 when no light becomes incident on the pixel MOS transistor 1 is set so as to fall within 2.0V, when the voltage equivalent to the channel potential corresponding to the signal charge of the pixel MOS transistor 1 is held in the load capacitor element 14 through the operation MOS switch 13, the influence of the jitter component can be reduced and the potential of the load capacitor element 14 can be readily stabilized to the signal voltage.

Furthermore, since the capacitance of the load capacitor element 14 is set to be equal to or greater than the capacitance of the vertical signal line 5, the KTC noise can be reduced and it is possible to obtain the solid-state imaging device with satisfactory S/N.

According to the present invention, there is provided the amplifier type solid-state imaging device of the capacitor load operation system in which the load capacitor element 14 is connected through the operation MOS switch 13 to the source of the pixel MOS transistor 1. The read operation for reading out the signal voltage from the pixel MOS transistor 1 to the load capacitor element 14 is ended in the sub-threshold region (i.e., weak inversion region).

Figure 13:
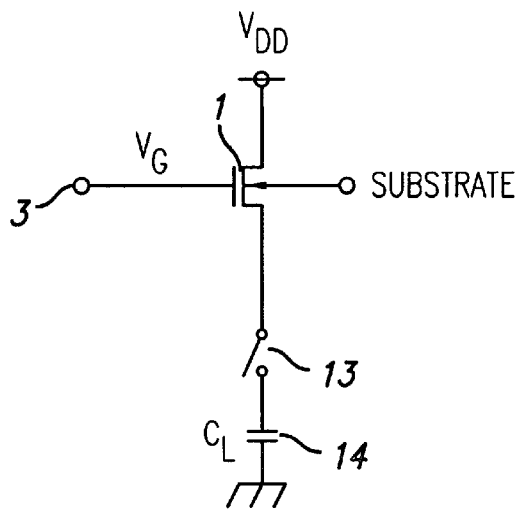
FIG. 13 is a diagram of an equivalent circuit used to explain operation of a pixel MOS transistor used in the amplifier type solid-state imaging device according to the present invention.

More specifically, in the amplifier type solid-state imaging device of the capacitor load operation system, as shown in an equivalent circuit of FIG. 13 used to explain the operation of the pixel MOS transistor 1, if a load capacitance $C_L$ of the load capacitor element 14, the mutual conductance gm of the pixel MOS transistor 1, the period (i.e., read-out period) tr in which the operation MOS switch 13 is turned on and the initial voltage $V_{CLi}$ of the load capacitor element 14 are set to be proper values, then the operation point of the pixel MOS transistor 1 can enter the sub-threshold region at the ending point of the read-out period.

Figure 14:
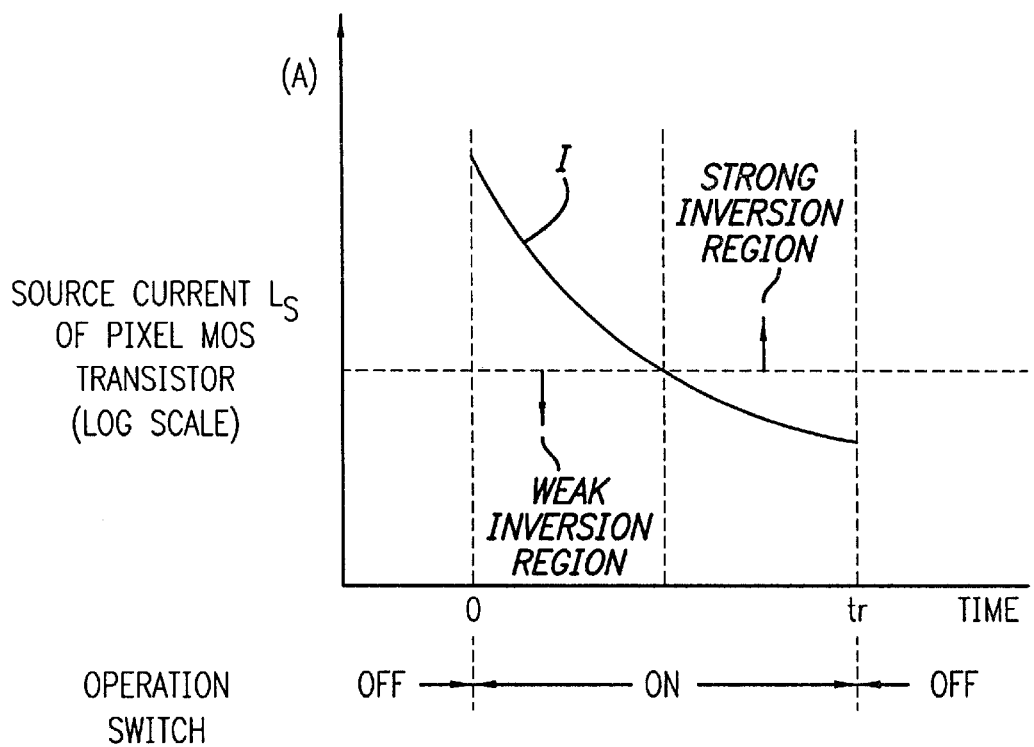
FIG. 14 is a graph showing the state of a source current $I_s$ of a pixel MOS transistor obtained during the period in which the operation MOS switch is turned on and off and to which reference will be made in explaining operation of the present invention.
Figure 15:
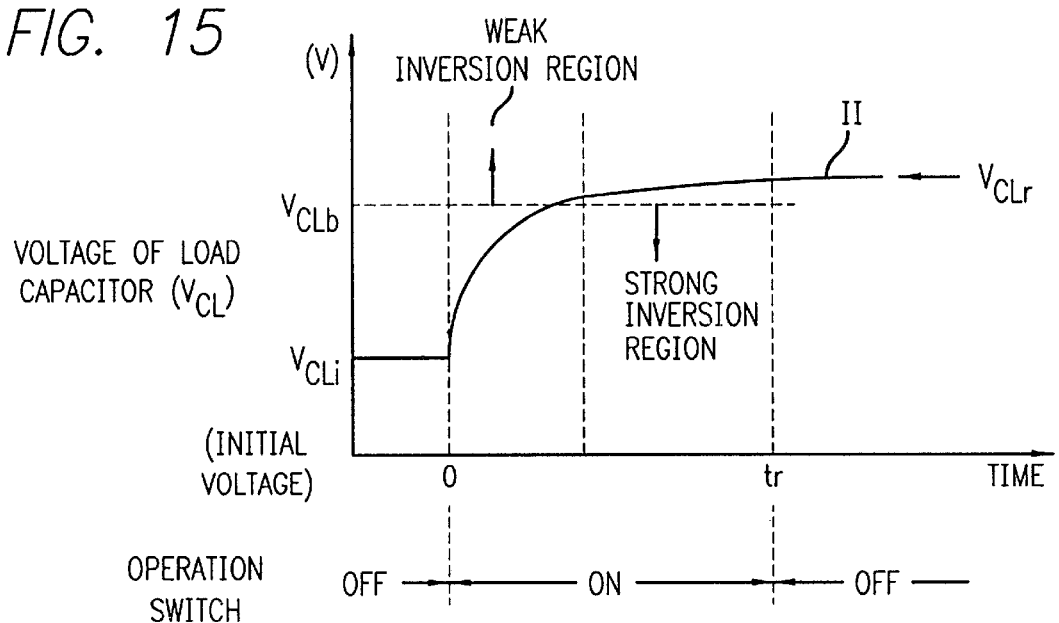
FIG. 15 is a graph showing the state of a load capacitor voltage $V_{CL}$ obtained during the period in which an operation MOS switch is turned on and off and to which reference will be made in explaining operation of the present invention.

The above-mentioned operation will be described with reference to FIGS. 14 and 15. When $V_{CLi}$ represents the initial voltage obtained in the load capacitor element 14 before the load capacitor element 14 is energized (operation for reading the signal charge of the pixel MOS transistor 1 to the load capacitor element 14 ), if the operation MOS switch 13 is turned on, then a gate-source voltage $V_\epsilon - V_{CL}$ of the pixel MOS transistor 1 is large so that the pixel MOS transistor 1 is activated in the saturation region (i.e., strong inversion region) to flow a large source current $I_s$ (i.e., so-called channel current) as shown by a curve I in FIG. 14. Thereafter, the voltage $V_{CL}$ of the load capacitor element 14 is increased (see curve II in FIG. 15) by this source current $I_s$, and the gate-source voltage $V_\epsilon - V_{CL}$ is decreased. As the gate-source voltage $V_\epsilon - V_{CL}$ is decreased, the source current $I_s$ also is decreased. Therefore, when the gate-source voltage $V_\epsilon - V_{CL}$ becomes smaller than $V_G - V_{CLb}$, the operation point of the pixel MOS transistor 1 is moved from the saturation region to the sub-threshold region. When a predetermined time is elapsed after the operation point of the pixel MOS transistor 1 is moved from the saturation region to the sub-threshold region, the operation MOS switch 13 is turned off and the signal voltage (read-out voltage) $V_{CLr}$ from the pixel MOS transistor 1 is held in the load capacitor element 14.

When the pixel MOS transistor 1 is operated as described above, at the end of the read-out period, the operation point enters the sub-threshold region so that the drain current (so-called channel current) is decreased extremely to reduce the mutual conductance gm.

As a result, a thermal agitation noise caused by the channel resistance of the pixel MOS transistor 1 and a 1/f noise caused by the surface level and the carrier movement between the channels are reduced considerably.

Specifically, the random noise of the pixel MOS transistor 1 is roughly classified as a thermal agitation noise caused by a channel resistance and a 1/f noise caused by surface level and carrier movement between the channels.

The thermal agitation noise is expressed by a drain noise current power spectrum $*in^2$ ($*in^2$ depicts square mean of in) as:

$$*in^2 = \tfrac{2}{3} 4KT \cdot gm \cdot \Delta f \tag{1}$$

where gm is the mutual conductance, $\Delta f$ is the band width, K is the Boltzmann constant and T is the absolute temperature (degree Kelvin).

The 1/f noise is expressed by a gate input conversion noise voltage power spectrum $*Vn^2$ ($*Vn^2$ depicts square mean of Vn) as:

$$*V_n^2 = \frac{q^2 t_{ox}^2 nT_e}{\varepsilon_{ox}^2 LW f} \Delta f \tag{2}$$

where g is the charge amount of electron, $t_{ox}$ is the film thickness of gate oxide film, $nT_e$ is the effective noise trap density, $\varepsilon_{ox}$ is the relative dielectric constant, L is the gate channel length, W is the gate channel width and f is the spectrum frequency.

A noise voltage power spectrum $*VnCL2$ ($*V_{nCL}^2$ depicts square mean of $V_{nCL}$) obtained when the above two noises are output at the terminal of the load capacitor element 14 in the equivalent circuit shown in FIG. 13 is expressed as:

$$*V_{nCL}^2 = \frac{1}{|j\omega C_L|^2}(*in^2 + gm^2 * V_n^2) \tag{3}$$

$$= \frac{1}{(2\pi)^2 f^2 C_L^2} \left\{ \frac{2}{3} 4KTgm\Delta f + gm^2 \frac{q^2 t_{ox}^2 nT_e}{\varepsilon_{ox}^2 LW f} \Delta f \right\}$$

At the operation final point of the capacitor load operation, the operation point lies in the sub-threshold region as described above and the mutual conductance gm applied to both items of the thermal agitation noise and the 1/f noise are reduced so that the random noise of the pixel MOS transistor 1 can be alleviated.

Furthermore, since the mutual conductance gm is lowered, the band width can be reduced and a thermal agitation noise caused over the high frequency band can be removed.

Thus, the random noise which is one of important evaluation standards of the solid-state imaging device can be suppressed. Therefore, it is possible to output a signal of very satisfactory picture quality.

In the read-out period, a time which the operation point with large drain current has in the saturation region is limited so that an electric power required to operate the pixel MOS transistor can be reduced considerably.

The read-out operation is ended when the current flowing from the pixel transistor to the load capacitor element, in this case, the channel current is changed to a current value lowered from the initial value by the amount of one digit or greater, preferably, a current value lowered from the initial value by the amount of two digits or more and preferably a current value lowered from the initial value by the amount of three digits. Thus, it is possible to reduce the random noise much more.

While the pixel transistor of the MOS structure shown in FIG. 6, i.e. the pixel MOS transistor 1, is used as the unit pixel in the solid-state imaging devices according to the embodiments of the present invention, the present invention is not limited thereto and it is possible to use a pixel transistor of a bipolar structure, i.e. a pixel bipolar transistor.

Figure 16A:
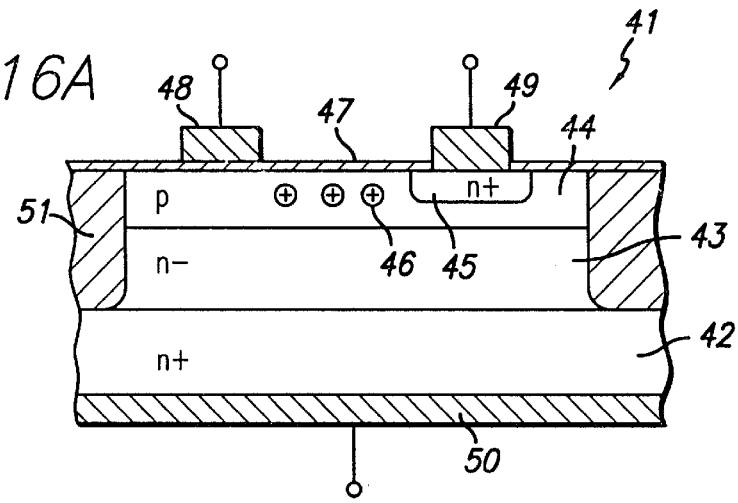
FIG. 16A is a cross-sectional view showing a semiconductor structure of a pixel bipolar transistor.
Figure 16B:
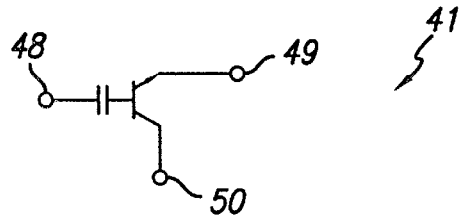
FIG. 16B is a diagram of an equivalent circuit of the pixel bipolar transistor.

FIG. 16A shows a semiconductor structure of a pixel bipolar transistor serving as the unit pixel. FIG. 16B shows an equivalent circuit of the pixel bipolar transistor shown in FIG. 16A.

As illustrated, a pixel bipolar transistor 41 comprises a highly doped silicon substrate 42 of a first conductivity type, e.g., n type, a collector region 43 of the same conductivity type, i.e. n type, a base region 44 of a second conductivity type, i.e. p type, for accumulating photoelectrically-converted signal charges (holes in this embodiment) 46 and an n-type emitter region 45 formed on one end of the silicon substrate 42. A control electrode 48 is formed on the base region 44 through an insulating layer 47 formed of $SiO_2$ or the like. An emitter electrode 49 is formed on the emitter region 45 and a collector electrode 50 is formed on the rear surface of the silicon substrate 42. In FIG. 16A, reference numeral 51 depicts an element separation region formed of an insulating layer for separating respective unit pixels.

In this pixel bipolar transistor 41, electrons generated by incident light, i.e. holes 46, are accumulated in the base region 44 and a base potential is changed. Then, a read pulse is applied to the control electrode 48 and a read signal corresponding to the changed amount of the base potential is read out from the emitter electrode 49. After the signal charge is read out, the signal charges 46 accumulated in the base region 44 are discharged to the substrate 50 side by grounding the emitter electrode 49 and applying the reset pulse of the positive voltage to the control electrode 48.

Figure 17:
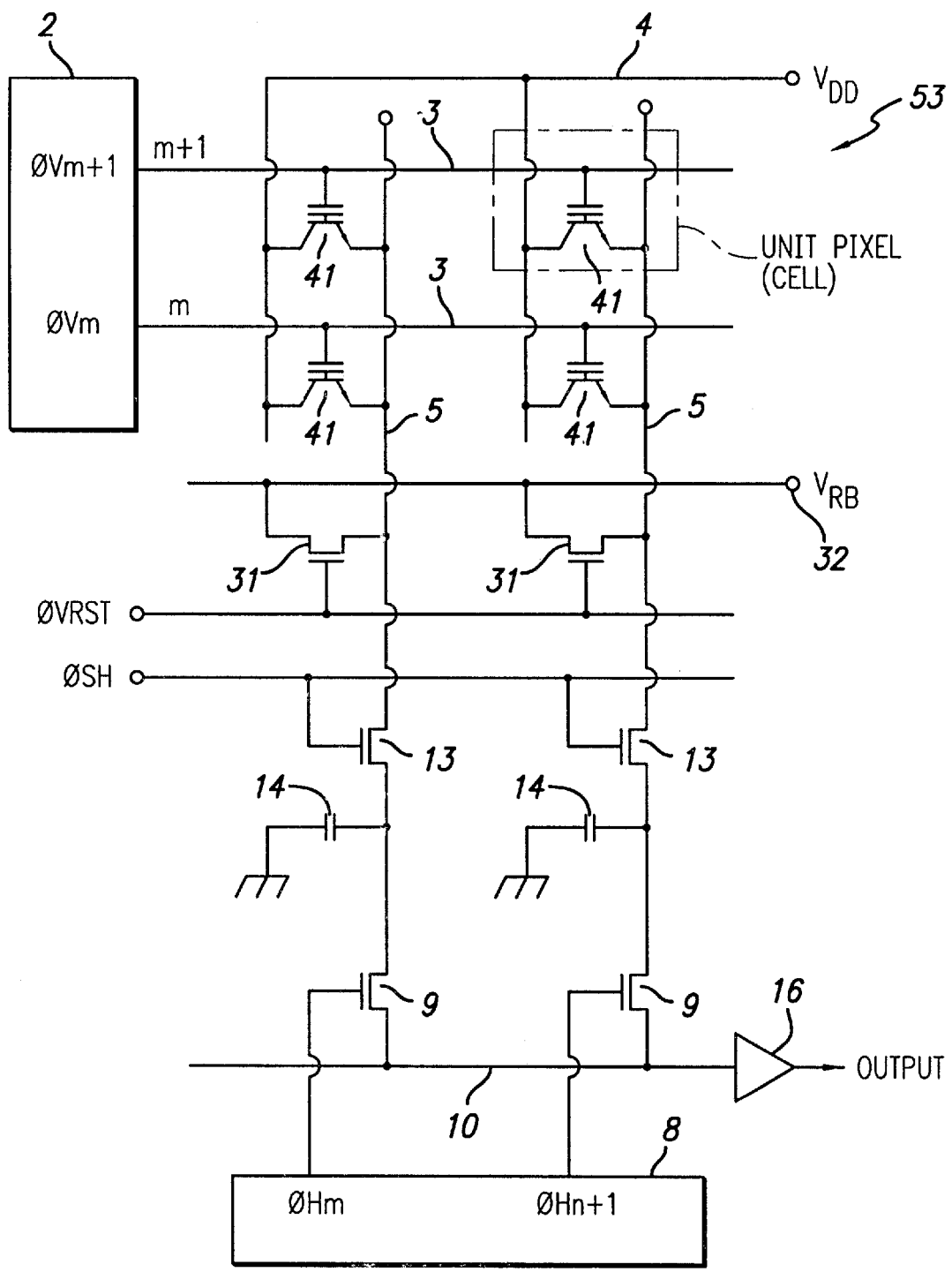
FIG. 17 is a schematic diagram showing an amplifier type solid-state imaging device according to a fifth embodiment of the present invention.
Figure 18:
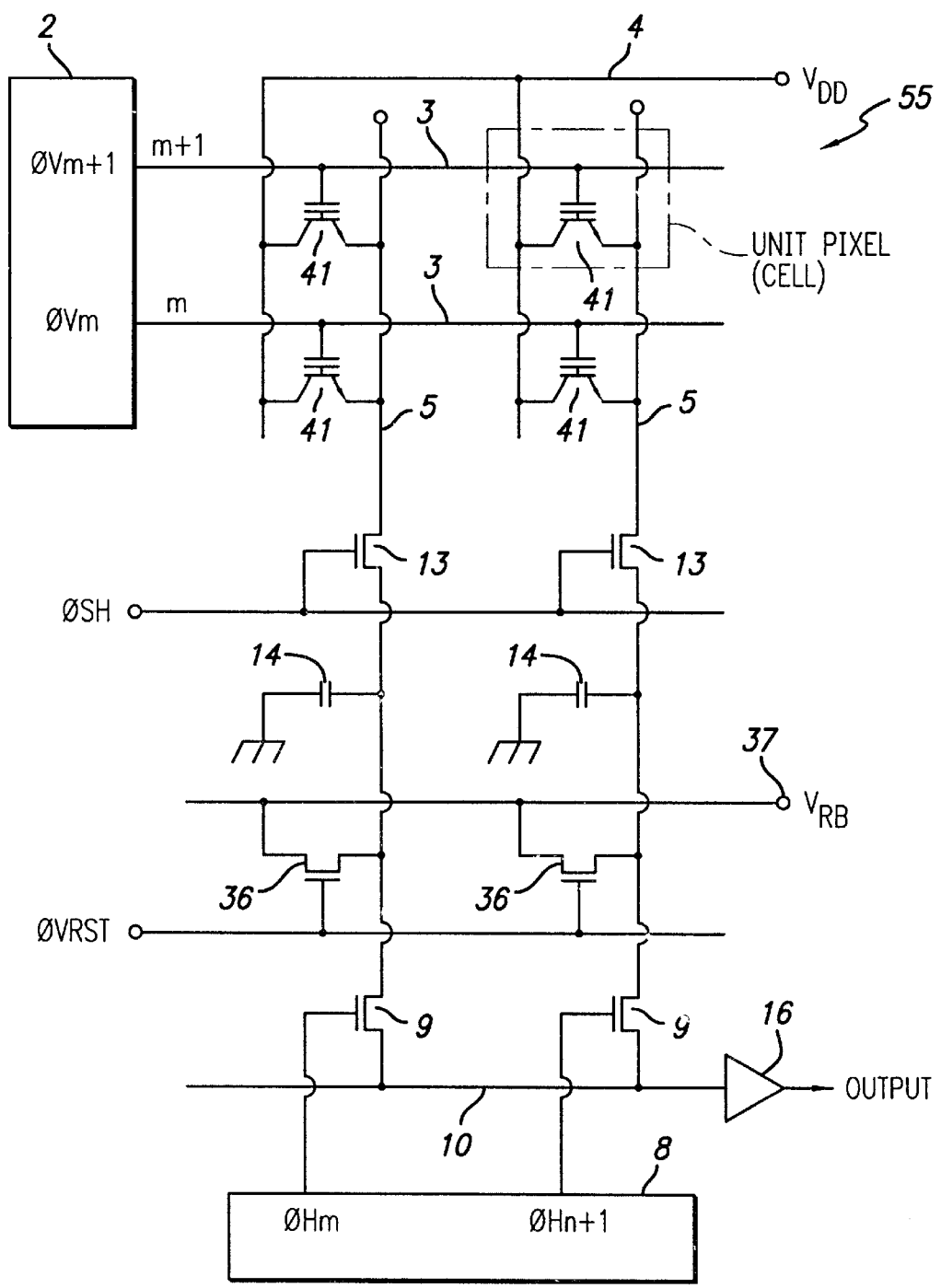
FIG. 18 is a schematic diagram showing an amplification type solid-state imaging device according to a sixth embodiment of the present invention.

FIGS. 17 and 18 are schematic diagrams showing solid-state imaging devices each using the pixel bipolar transistor 41 as the unit pixel according to fifth and sixth embodiments of the present invention, respectively.

An amplifier type solid-state imaging device 53 shown in FIG. 17 corresponds to the solid-state imaging device 33 shown in FIG. 9.

Specifically, in the solid-state imaging device 53, there are provided a plurality of pixel bipolar transistor 41 which are arrayed in a matrix fashion. A control electrode 48 of the pixel bipolar transistor 41 is connected to the vertical scanning circuit 2 formed of a shift register or the like and connected to the vertical scanning line 3. A collector electrode 50 of the pixel bipolar transistor 41 is connected to the power supply line 4 of the voltage $V_{DD}$ and the emitter electrode 49 thereof is connected to the vertical signal line 5.

The load capacitor element 14 for holding the signal voltage is connected to the vertical signal line 5 through the operation MOS switch 13, and the vertical signal line reset MOS switch 31 also serving to reset the load capacitor element 14 is connected to the vertical signal line 5 at the side of the operation MOS switch 13 adjacent the signal line 5.

The source of the reset MOS switch 31 is connected to the vertical signal line 5, the drain thereof is connected to the reset bias terminal 32 to which the reset bias voltage $V_{RB}$ is supplied and the gate thereof is supplied with the reset pulse $\phi_{VRST}$. The load capacitor element 14 is connected between the vertical signal line 5 and the first potential, i.e. the ground potential in this embodiment. The operation pulse $\phi_{SH}$ is applied to the gate of the operation MOS switch 13.

The reset potential, i.e. reset voltage $V_{RB}$ of the load capacitor element 14, is set to be shallower than the base potential obtained in the pixel bipolar transistor 41 when no light becomes incident onto the pixel bipolar transistor 41. Also, the potential difference between it and the base potential obtained in the pixel bipolar potential when no light becomes incident on the pixel bipolar transistor 41 is set so as to fall within 2.0V.

The capacitance of the load capacitor element 14 is set to be equal to or greater than the capacitance of the vertical signal line 5.

In FIG. 17, reference numeral 8 depicts the horizontal scanning circuit formed of the shift register or the like, 9 the horizontal MOS switch connected to the vertical signal line 5, 10 the horizontal signal line connected to the horizontal MOS switch 9 and 16 the output circuit connected to the end portion of the horizontal signal line 10.

Operation of the amplifier type solid-state imaging device 53 is different only in the operation concerning the pixel bipolar transistor 41 and similar to the amplifier type solid-state imaging device 33 shown in FIG. 7. Therefore, the operation of the amplifier type solid-state imaging device 53 need not be described herein.

Thus, according to the solid-state imaging device 53 shown in FIG. 17, before the operation period of the pixel bipolar transistor 41 in the horizontal blanking period HBK, the vertical signal line reset MOS switch 31 and the operation MOS switch 13 are simultaneously turned on to thereby reset the initial voltages of the vertical signal line 5 and the load capacitor element 14 to the reset bias voltage $V_{RB}$. Therefore, it is sufficient to provide one reset MOS switch 31. Thus, the arrangement of the horizontal output circuit portion can be simplified and the area of the solid-state imaging chip can be reduced.

Moreover, since the number of the reset MOS switch is reduced, the number of the terminal pins can be reduced and the interconnection length can be reduced, thereby making it possible to decrease the crosstalk component from the adjacent pixel.

Further, since the reset potential of the load capacitor element 14, i.e., reset voltage $V_{RB}$ is set to be shallower than the base potential obtained in the pixel bipolar transistor 41 when no light becomes incident on the pixel bipolar transistor 41 and the potential difference between it and the base potential obtained in the pixel bipolar transistor 41 when no light becomes incident on the pixel bipolar transistor 41 is set so as to fall within 2.0V, when the voltage that is equivalent to the base potential corresponding to the signal charge of the pixel bipolar transistor 41 is held in the load capacitor element 14 through the operation MOS switch 13, influence of the jitter component can be decreased and it is possible to readily stabilize the potential of the load capacitor element 14 to the signal voltage.

Furthermore, since the capacitance of the load capacitor element 14 is set to be equal to or greater than the capacitance of the vertical signal line 5, the KTC noise can be decreased and it is possible to obtain the solid-state imaging device with satisfactory S/N.

FIG. 18 shows an amplifier type solid-state imaging device 55 according to a sixth embodiment of the present invention. The amplifier type solid-state imaging device 55 shown in FIG. 18 corresponds to the solid-state imaging device 35 shown in FIG. 12.

Specifically, as shown in FIG. 18, in the solid-state imaging device 55, there are provided a plurality of pixel bipolar transistors 41 which are arrayed in a matrix fashion. The control electrode 48 of the pixel bipolar transistor 41 is connected to the vertical scanning line 3 led out from the vertical scanning circuit 2, the collector electrode 50 thereof is connected to the power supply line 4 and the emitter electrode 49 thereof is connected to the vertical signal line 5.

The load capacitor element 14 for holding the signal voltage is connected through the operation MOS switch 13 to the vertical signal line 5, and the load capacitor reset MOS switch 36, also serving to reset the vertical signal line 5 is connected to the vertical signal line 5 through the switch 13, and is located on the load capacitor element 14 side of switch 13.

The source of the reset MOS switch 36 is connected to the vertical signal line 5 and the drain thereof is connected to a reset bias terminal 37 to which the reset bias voltage $V_{RB}$ is supplied. The reset pulse $\phi_{VRST}$ is supplied to the gate of the reset MOS switch 36.

The load capacitor element 14 is connected between the vertical signal line 5 and the first potential, i.e. the ground potential in this embodiment. The operation pulse $\phi_{SH}$ is applied to the gate of the operation MOS switch 13.

The reset potential of the load capacitor element 14, i.e. reset voltage $V_{RB}$, is set to be shallower than the base potential obtained in the pixel bipolar transistor 41 when no light becomes incident on the pixel bipolar transistor 41 and the potential difference between it and the base potential obtained in the pixel bipolar transistor 41 when no light becomes incident on the pixel bipolar transistor 41 is set so as to fall within 2.0V.

The capacitance of the load capacitor element 14 is set to be equal to or greater than the capacitance of the vertical signal line 5.

In FIG. 18, reference numeral 8 depicts the horizontal scanning circuit formed of the shift register or the like, 9 the horizontal MOS switch connected to the vertical signal line 5, 10 the horizontal signal line, and 16 the output circuit.

Operation of the amplifier type solid-state imaging device 55 is similar to that of the amplifier type solid-state imaging device 35 shown in FIG. 12 except the operation concerning the pixel bipolar transistor 41 and therefore need not be described herein.

Therefore, in the amplifier type solid-state imaging device 55 shown in FIG. 18, before the operation period of the pixel bipolar transistor 41 in the horizontal blanking period, the reset MOS switch 36 and the operation MOS switch 13 are simultaneously turned on to reset the initial voltages of the vertical signal line 5 and the load capacitor element 14 to the reset bias voltage $V_{RB}$. Thus, it is sufficient to provide one reset MOS switch 36. Therefore, the arrangement of the horizontal output circuit portion can be simplified and the area of the solid-state imaging chip can be reduced.

Further, since the reset MOS switch 36 is connected to the vertical signal line 5 through the switch 13 and is positioned at the load capacitor element 14, when the load capacitor element 14 is reset to the reset bias voltage $V_{RB}$, the load capacitor element 14 is reset through the MOS switch 36 so that the influence exerted by the channel resistance of the MOS switch is small. Therefore, as compared with the solid-state imaging device 53 shown in FIG. 17, the reset speed can be increased and the reset potential of the load capacitor element 14 can be readily stabilized.

Furthermore, since the reset potential of the load capacitor element 14, i.e., reset voltage $V_{RB}$ is set to be shallower than the base potential obtained in the pixel transistor 41 when no light becomes incident on the pixel bipolar transistor 41 and the potential difference between the it and the base potential obtained in the pixel bipolar transistor 41 when no light becomes incident on the pixel bipolar transistor 41 is set so as to fall within 2.0V, when the voltage that is equivalent to the base potential corresponding to the signal charge of the pixel bipolar transistor 41 is held in the load capacitor element 14 through the operation MOS transistor 13, the influence of the jitter component can be decreased and it is possible to readily stabilize the potential of the load capacitor element 14 to the signal voltage.

Furthermore, since the capacitance of the load capacitor element 14 is set to be equal to or greater than the capacitance of the vertical signal line 5, the KTC noise can be decreased and it is possible to obtain the solid-state imaging device with satisfactory S/N.

While the pixel MOS transistor 1 is formed as the pixel structure of the n-channel MOS transistor as described above, the present invention is not limited thereto and may be applied to a pixel transistor of a p-channel MOS transistor in which n-type/p-type of impurity is inverted.

Further, while the pixel bipolar transistor 41 is formed as the pixel structure of the npn bipolar transistor as described above, the present invention is not limited thereto and may be applied to a pixel structure of a pnp transistor in which n-type/p-type impurity is inverted.

In the case of the above-mentioned examples, it is possible to apply the pixel transistors to the present invention in exactly the same manner only by inverting the polarity of the applied voltage.

While the operation timing of the solid-state imaging device according to the present invention corresponds to the non-interlace operation timing as described above, the present invention is not limited thereto and the operation timing of the solid-state imaging device according to the present invention may of course be applied to the interlace operation timing.

According to the solid-state imaging device of the present invention, since the solid-state imaging device of the present invention is operated in the capacitor load operation system, uniform sensitivity can be obtained and also it is possible to obtain the solid-state imaging device with high sensitivity.

Since the load is the capacitor, it is possible to obtain the solid-state imaging device in which the load MOS transistor can be substantially prevented from being fluctuated and in which the vertical stripe-shaped fixed pattern noise (FPN) is difficult to take place. Also, it is possible to obtain the solid-state imaging device in which a power consumption can be reduced.

Since the capacitance of the capacitor is set to be equal to or greater than the capacitance of the vertical signal line, the KTC noise can be decreased and the S/N can be improved.

Since the switch is connected between the vertical signal line and the capacitor and the reset means is connected to the capacitor side rather than the switch, when the capacitor serving as the load is reset, the capacitor can be set to the reset potential more stably.

Since the vertical signal line and the capacitor are simultaneously reset by one reset means, the arrangement of the horizontal output circuit can be simplified and the area of the solid-state imaging chip can be reduced.

Further, since the reset potential of the capacitor is set to be shallower than the channel potential or base potential of the pixel transistor and the potential difference between it and the channel potential or base potential obtained when no light becomes incident on the pixel transistor is set to fall within 2.0V, when the voltage that is equivalent to the channel potential or base potential corresponding to the signal charge of the pixel transistor is held, the influence of the jitter component can be decreased and it is possible to readily stabilize the potential of the capacitor to the signal voltage.

Further, in the capacitor load operation system solid-state imaging device, since the reading operation for reading the signal voltage from the pixel transistor to the load capacitor is completed in the weak inversion region, it is possible to reduce the random noise generated from the pixel transistor. Also, it is possible to reduce the power consumption.

Furthermore, since the reading operation for reading the signal voltage from the pixel transistor to the load capacitor is completed when the current that flows from the pixel transistor to the load capacitor becomes the current value which is lower than the initial value by one digit or greater, the random noise generated from the pixel transistor can be decreased more reliably and the power consumption can be reduced.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A solid-state imaging device, comprising:
    a plurality of pixel units for storing signal charges generated by photo-electric conversion, a signal voltage of each pixel unit corresponding to an amount of accumulated signal charge, each of said pixel units being connected to a vertical scanning line and to a vertical signal line to which said signal voltage is read out;
    a capacitor connected between said vertical signal line and a fixed potential;
    a reset switch for resetting a potential of said capacitor to a reset potential;
    a connection switch in said vertical signal line for controlling a connection between one of said pixel units and said capacitor so that the potential of said capacitor has a same potential as a potential of the pixel unit selected, one end of said reset switch being connected between said connection switch and a horizontal switch connected to an output, and one end of the capacitor being connected to a junction between the connection switch and the horizontal switch; and
    a capacitance of said capacitor being equal to or larger than a capacitance of said vertical signal line such that KTC noise is reduced to obtain improved signal-to-noise ratio.

2. A solid-state imaging device according to claim 1 wherein said connection switch comprises an MOS transistor.

3. A solid-state imaging device according to claim 1 wherein said reset switch comprises an MOS transistor.

4. A solid-state imaging device according to claim 1 wherein said reset switch is connected directly parallel to said capacitor.

5. A solid-state imaging device according to claim 1 wherein said capacitor and said reset switch are connected to ground potential.

6. A solid-state imaging device, comprising:
    a plurality of pixel units for storing signal charges generated by photo-electric conversion, a signal voltage of each pixel unit corresponding to an amount of accumulated signal charge, each of said pixel units being connected to a vertical scanning line and to a vertical signal line to which said signal voltage is read out;
    a capacitor connected between said vertical signal line and a fixed potential;
    a reset switch for resetting a potential of said capacitor to a reset potential;
    a connection switch in said vertical signal line for controlling a connection between one of said pixel units and said capacitor so that the potential of said capacitor has a same potential as a potential of the pixel unit selected, one end of said reset switch being connected between said connection switch and a horizontal switch connected to an output, and one end of the capacitor being connected to a junction between the connection switch and the horizontal switch; and
    a capacitance of said capacitor being equal to or larger than a capacitance of said vertical signal line such that KTC noise is reduced to obtain improved signal-to-noise ratio.

* * * * *